United States Patent
Yasui

(10) Patent No.: US 10,423,369 B2
(45) Date of Patent: Sep. 24, 2019

(54) RECORDING MEDIUM

(71) Applicant: BROTHER KOGYO KABUSHIKI KAISHA, Nagoya-shi, Aichi (JP)

(72) Inventor: Ryo Yasui, Nagoya (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 0 days.

(21) Appl. No.: 16/126,208

(22) Filed: Sep. 10, 2018

(65) Prior Publication Data

US 2019/0087137 A1   Mar. 21, 2019

(30) Foreign Application Priority Data

Sep. 15, 2017   (JP) ................................. 2017-177955

(51) Int. Cl.
*H04N 1/04* (2006.01)
*G06F 3/12* (2006.01)
*G06F 3/0486* (2013.01)

(52) U.S. Cl.
CPC .......... *G06F 3/1208* (2013.01); *G06F 3/0486* (2013.01); *G06F 3/1204* (2013.01); *G06F 3/1243* (2013.01); *G06F 3/1256* (2013.01)

(58) Field of Classification Search
CPC .... G06F 3/1208; G06F 3/1204; G06F 3/1256; G06F 3/1243; G06F 3/0486
USPC ....................................................... 358/1.15
See application file for complete search history.

(56) References Cited

U.S. PATENT DOCUMENTS

| | | | | |
|---|---|---|---|---|
| 5,404,442 A * | 4/1995 | Foster | ................... | G06F 3/0481 715/210 |
| 2010/0269033 A1* | 10/2010 | Siegel | ................... | G06F 17/211 715/234 |
| 2014/0351725 A1* | 11/2014 | Kim | ..................... | G06F 3/04883 715/765 |
| 2017/0091153 A1* | 3/2017 | Thimbleby | ........... | G06F 17/212 |

FOREIGN PATENT DOCUMENTS

JP     2008-304959 A    12/2008

* cited by examiner

*Primary Examiner* — Houshang Safaipour
(74) *Attorney, Agent, or Firm* — Scully, Scott, Murphy & Presser, PC

(57) ABSTRACT

The disclosure discloses a non-transitory computer-readable recording medium storing a printing processing program for executing steps on a CPU. In an editing screen display step, a display device displays an editing screen that includes an appearance virtual image of a printed matter. In a drag operation determination step, it is determined whether or not a text object or a text editing area frame is moved and arranged on an extended line of the appearance virtual image. In a first virtual image expansion step, the display device expands the appearance virtual image to include at least a portion of the text object or the text editing area frame arranged on the extended line, in the case that it is determined that the text object or the text editing area frame is arranged on the extended line.

12 Claims, 39 Drawing Sheets

[FIG. 1]
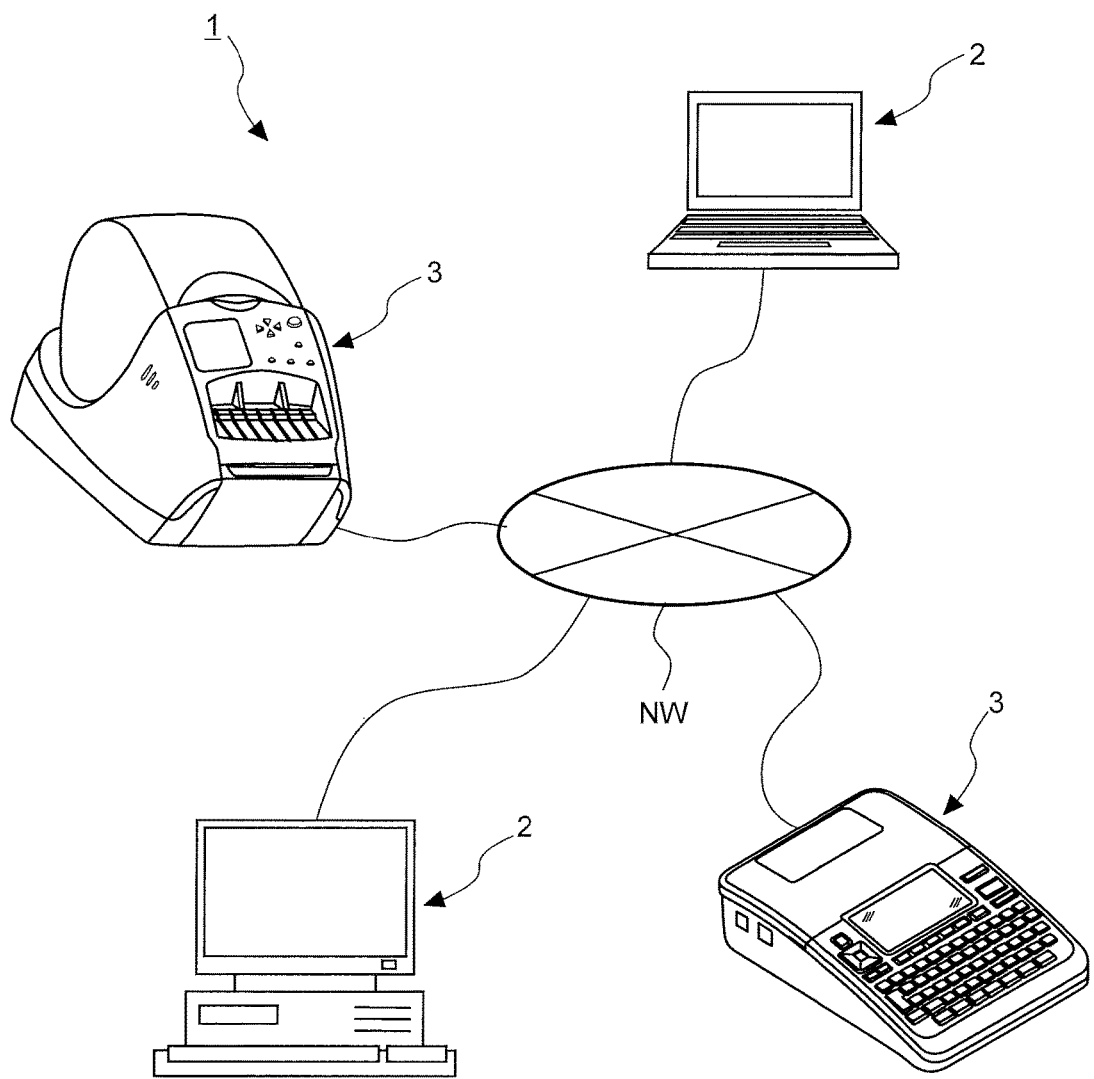

[FIG. 2]
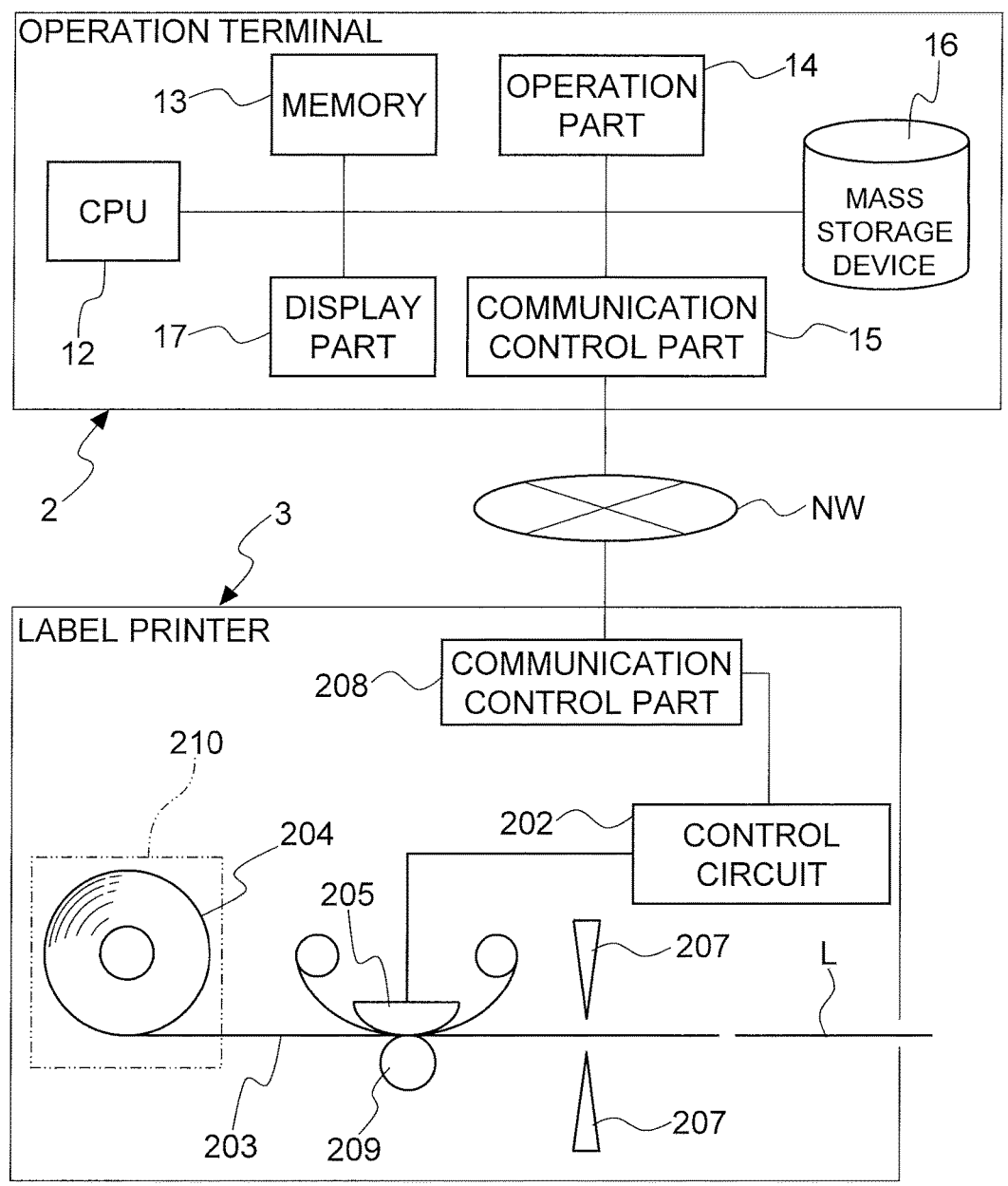

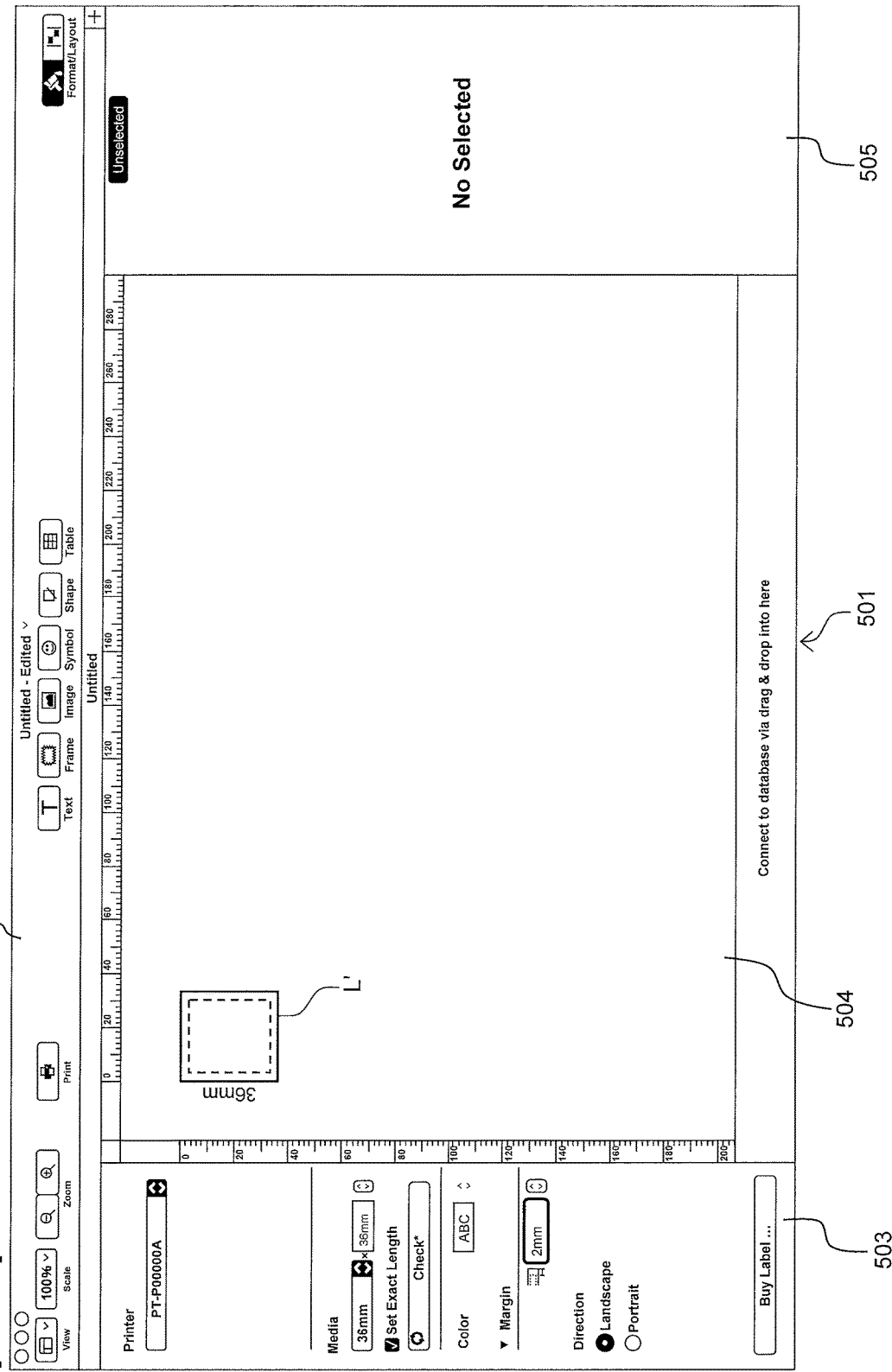

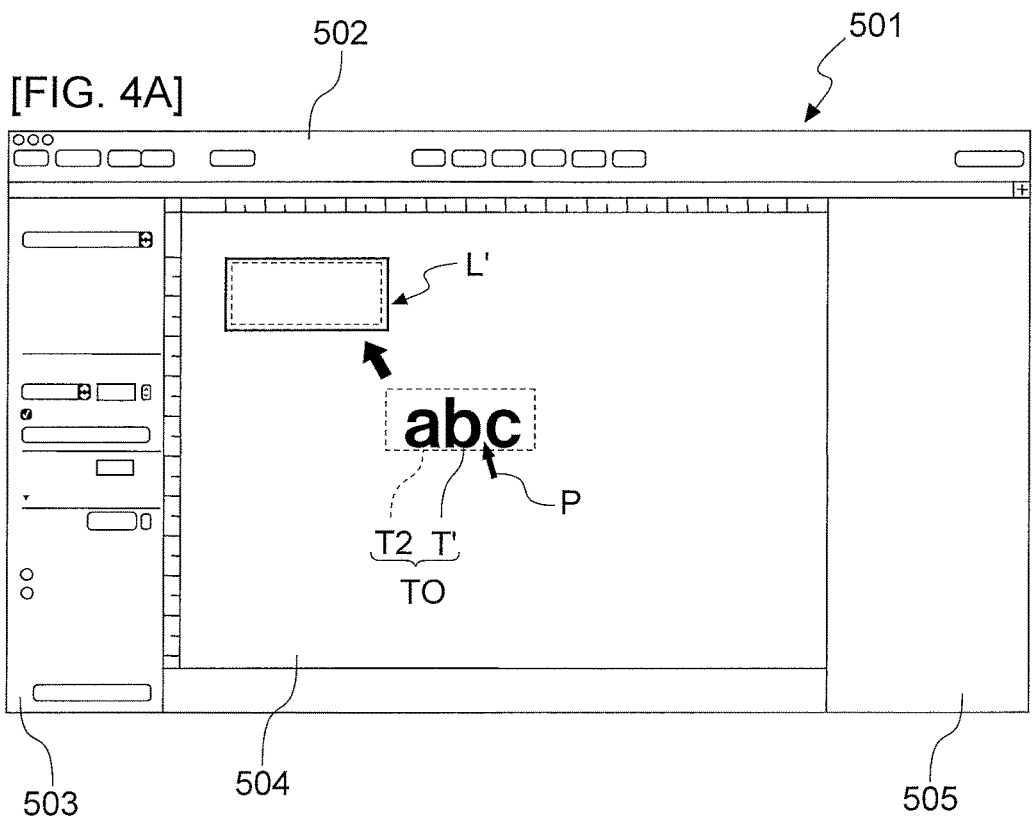
[FIG. 4A]
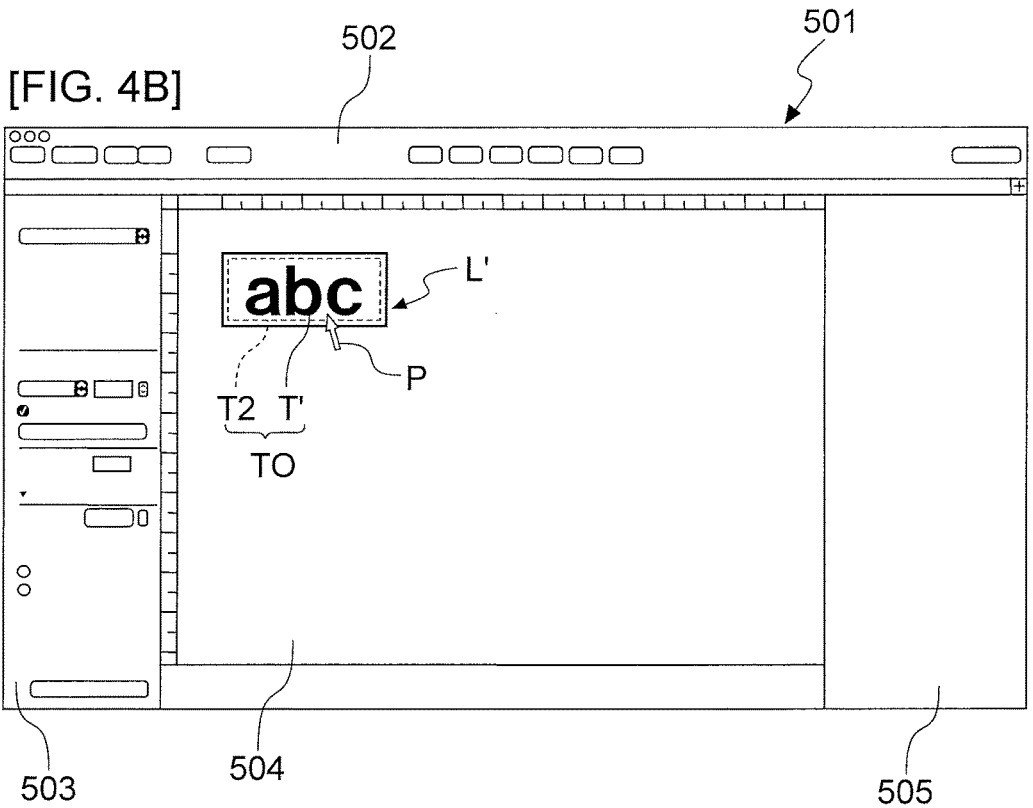
[FIG. 4B]

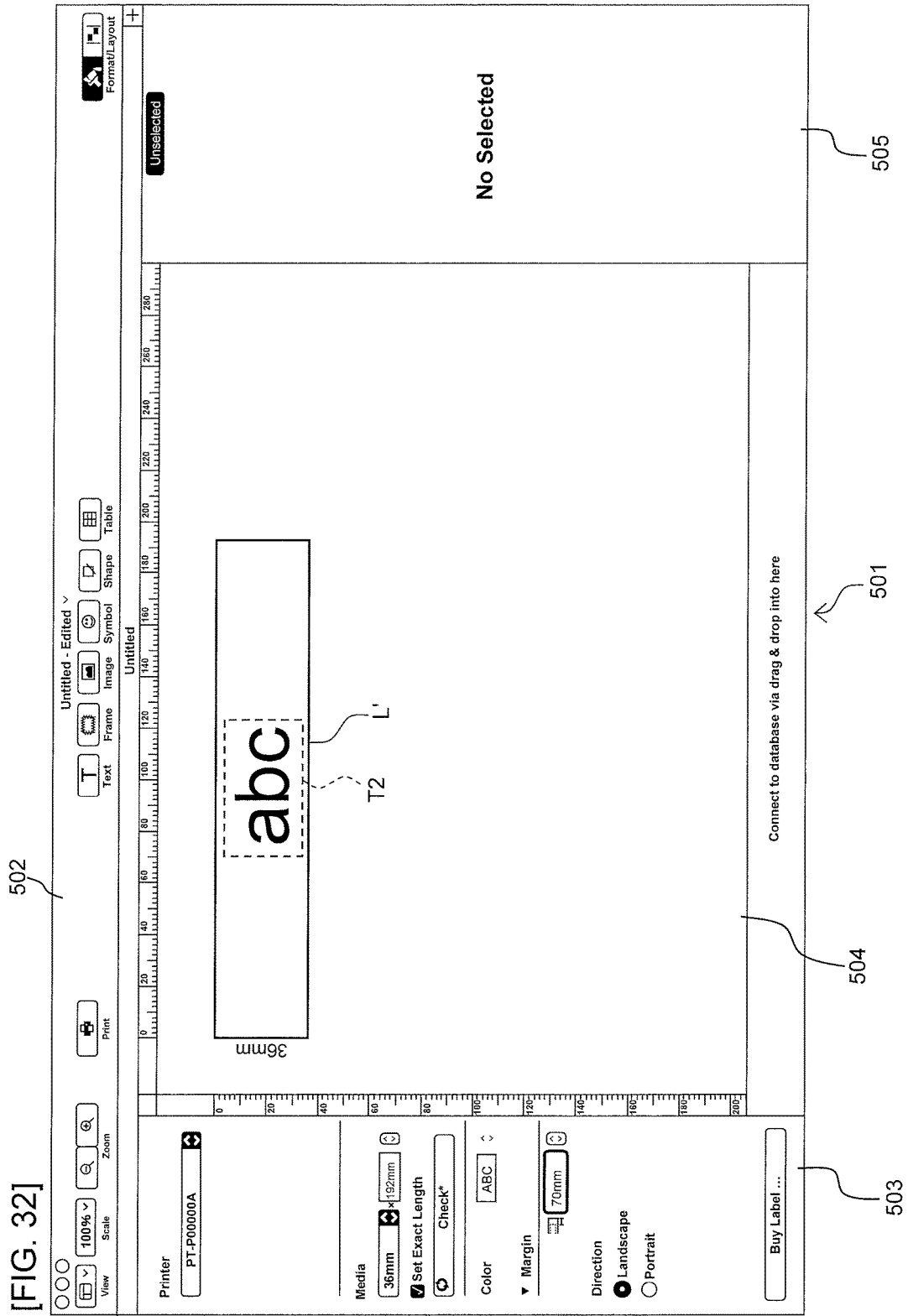

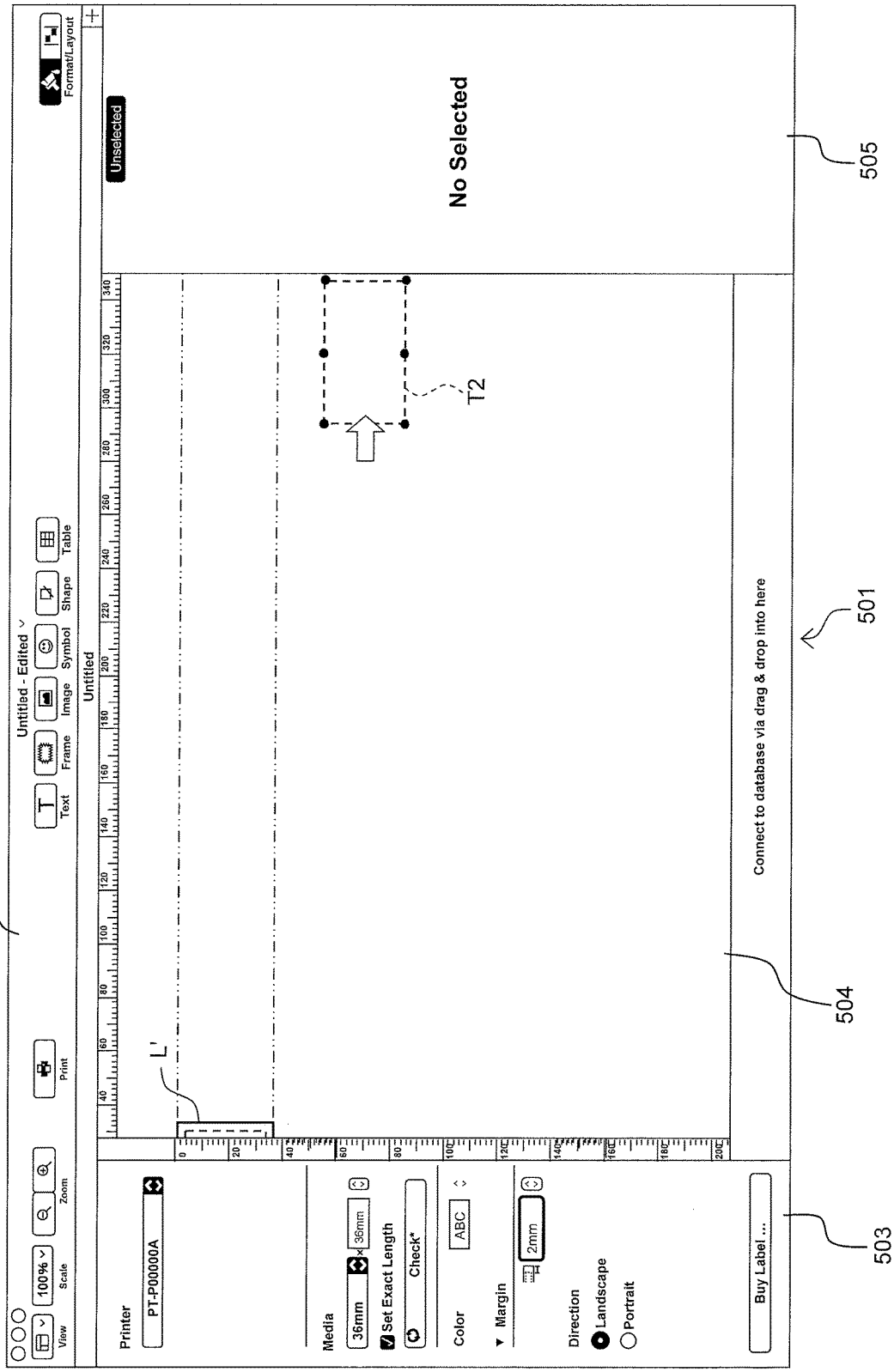
[FIG. 33]

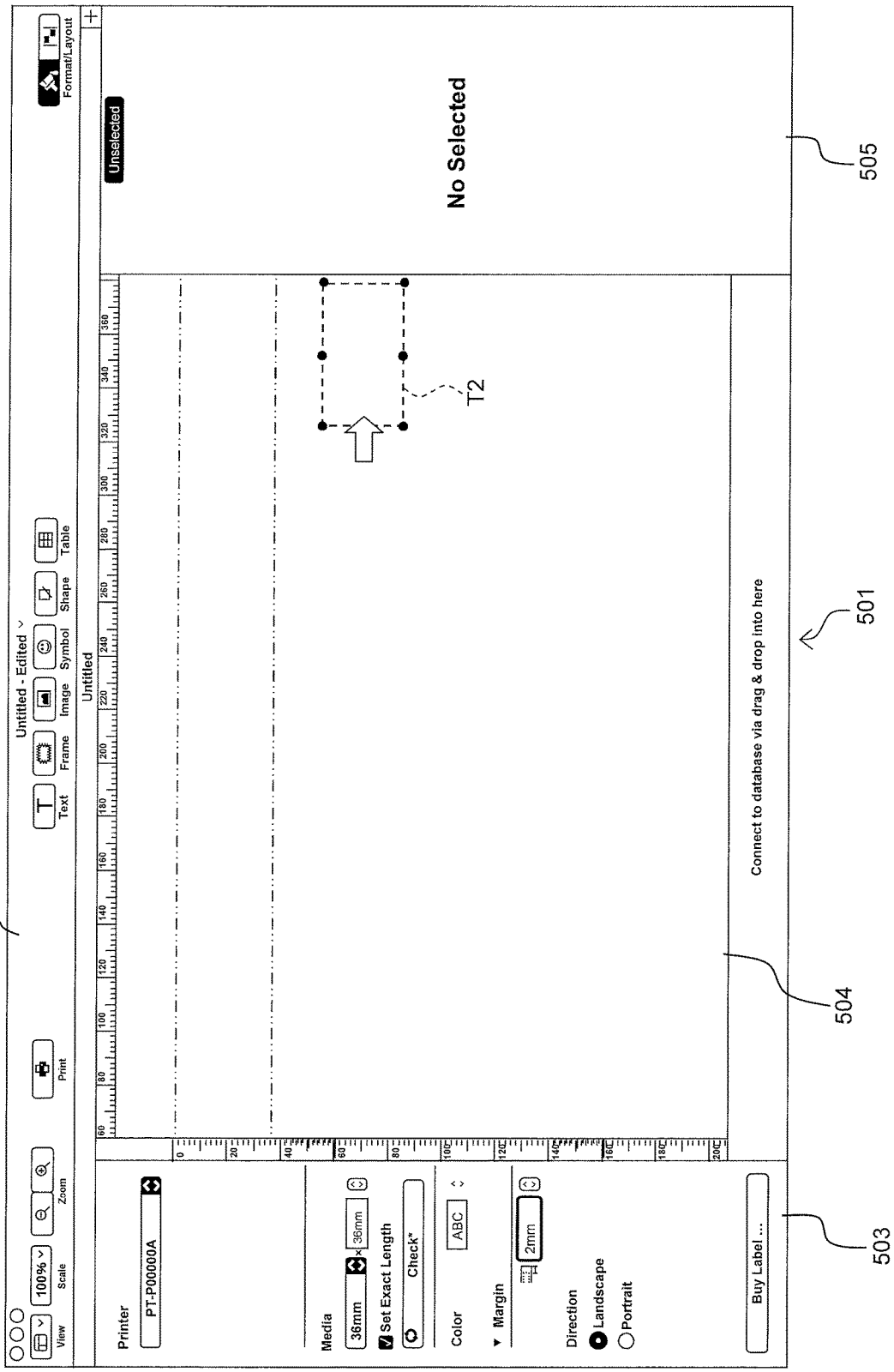

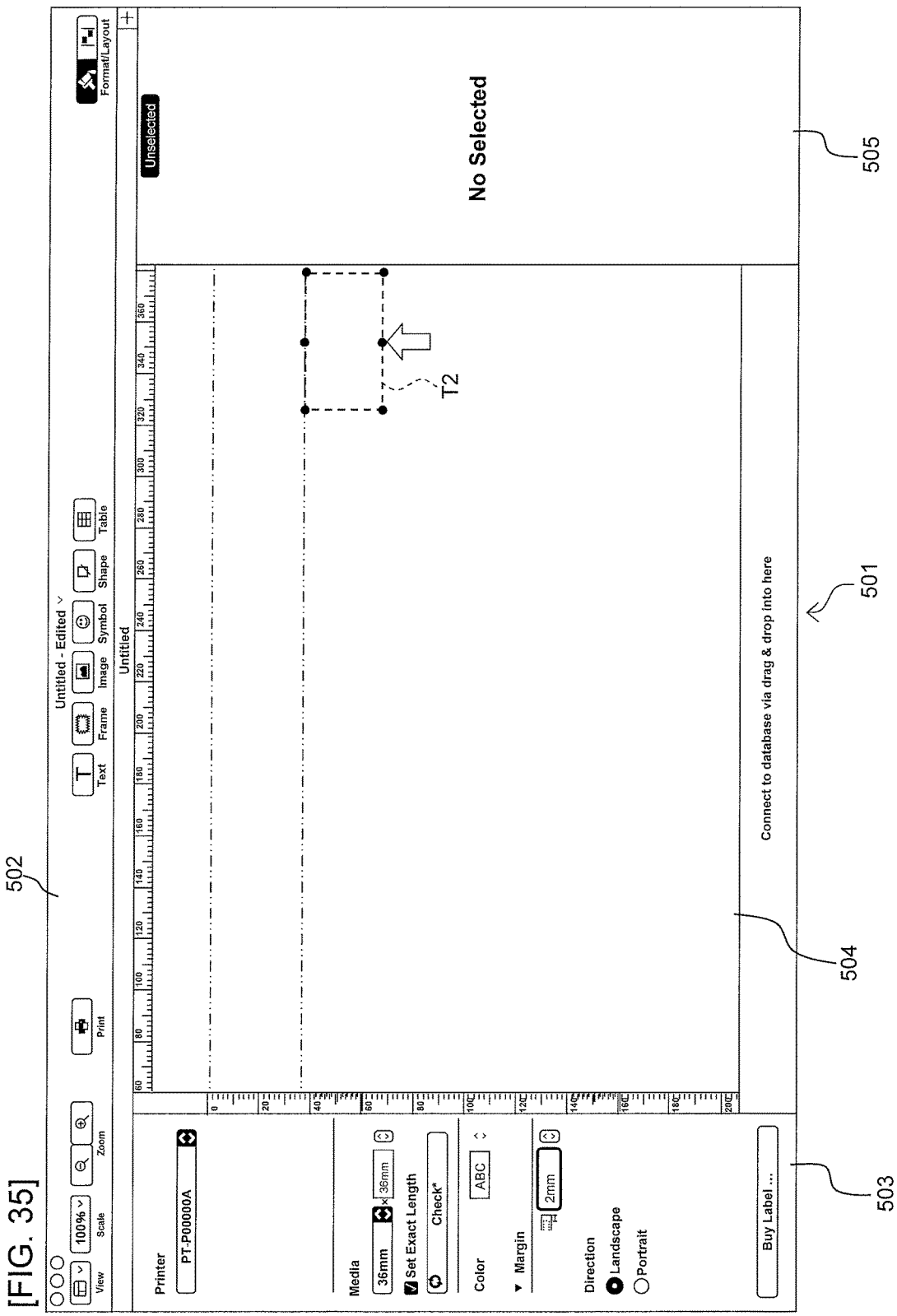

[FIG. 36]
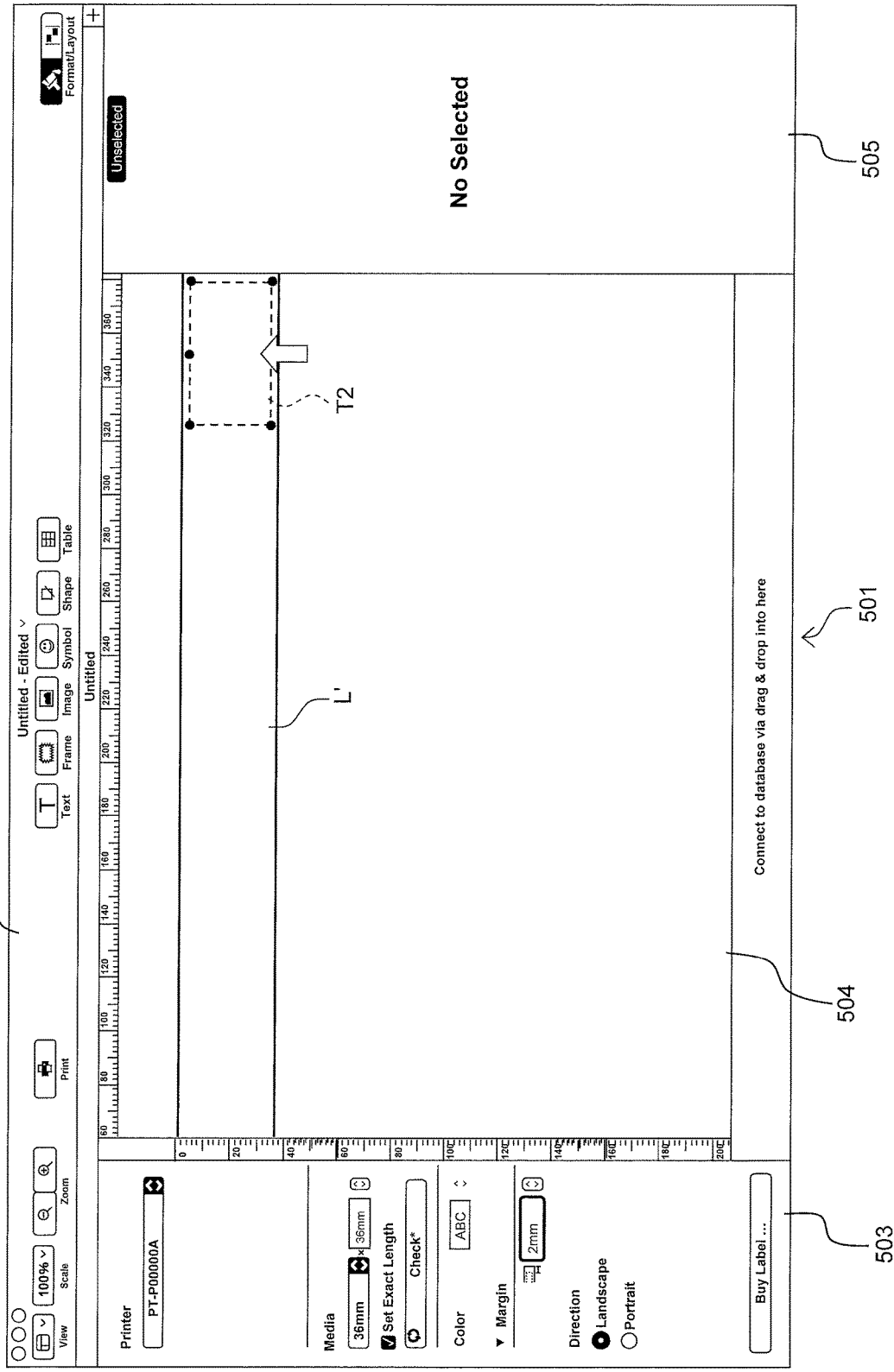

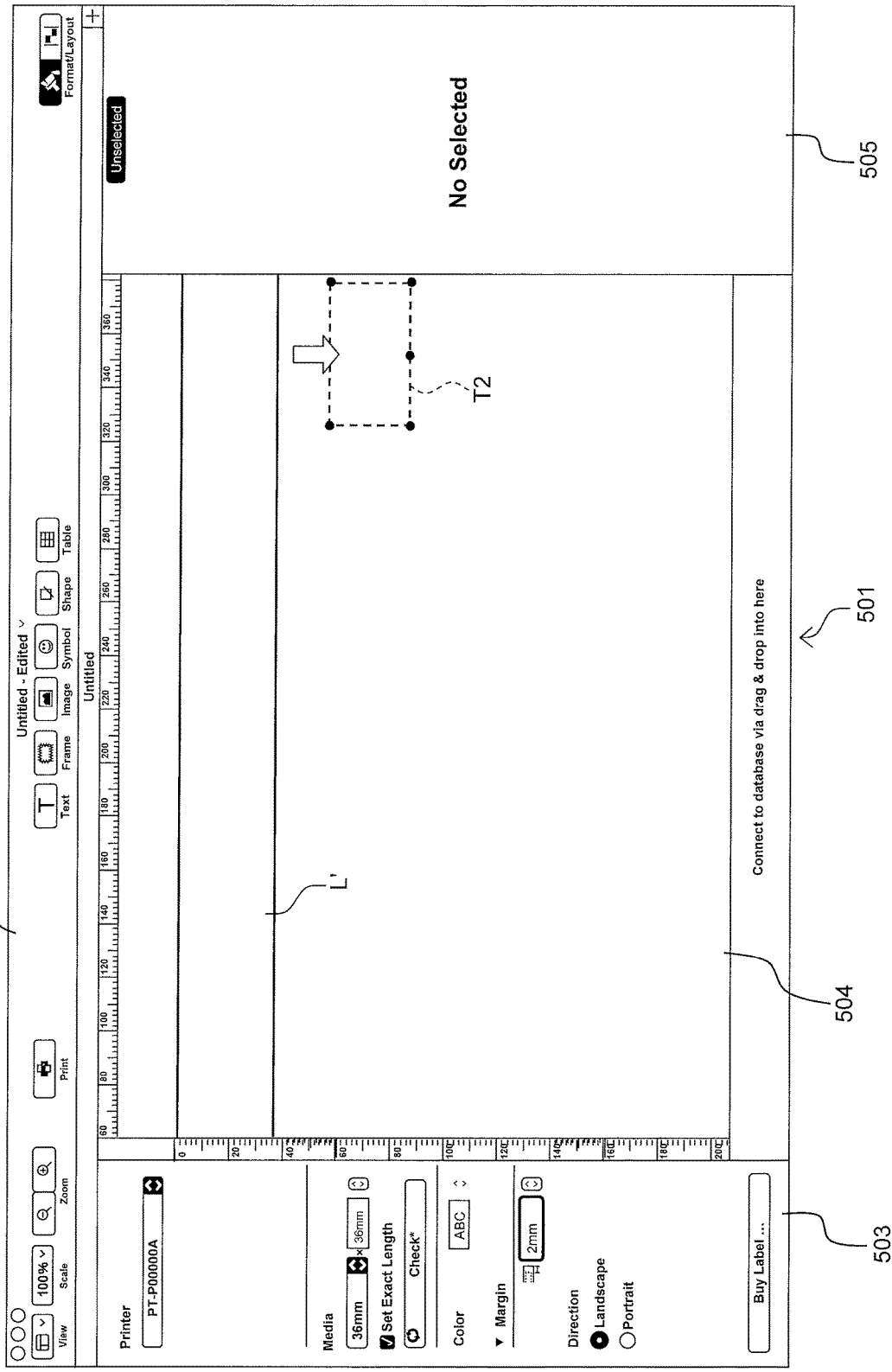

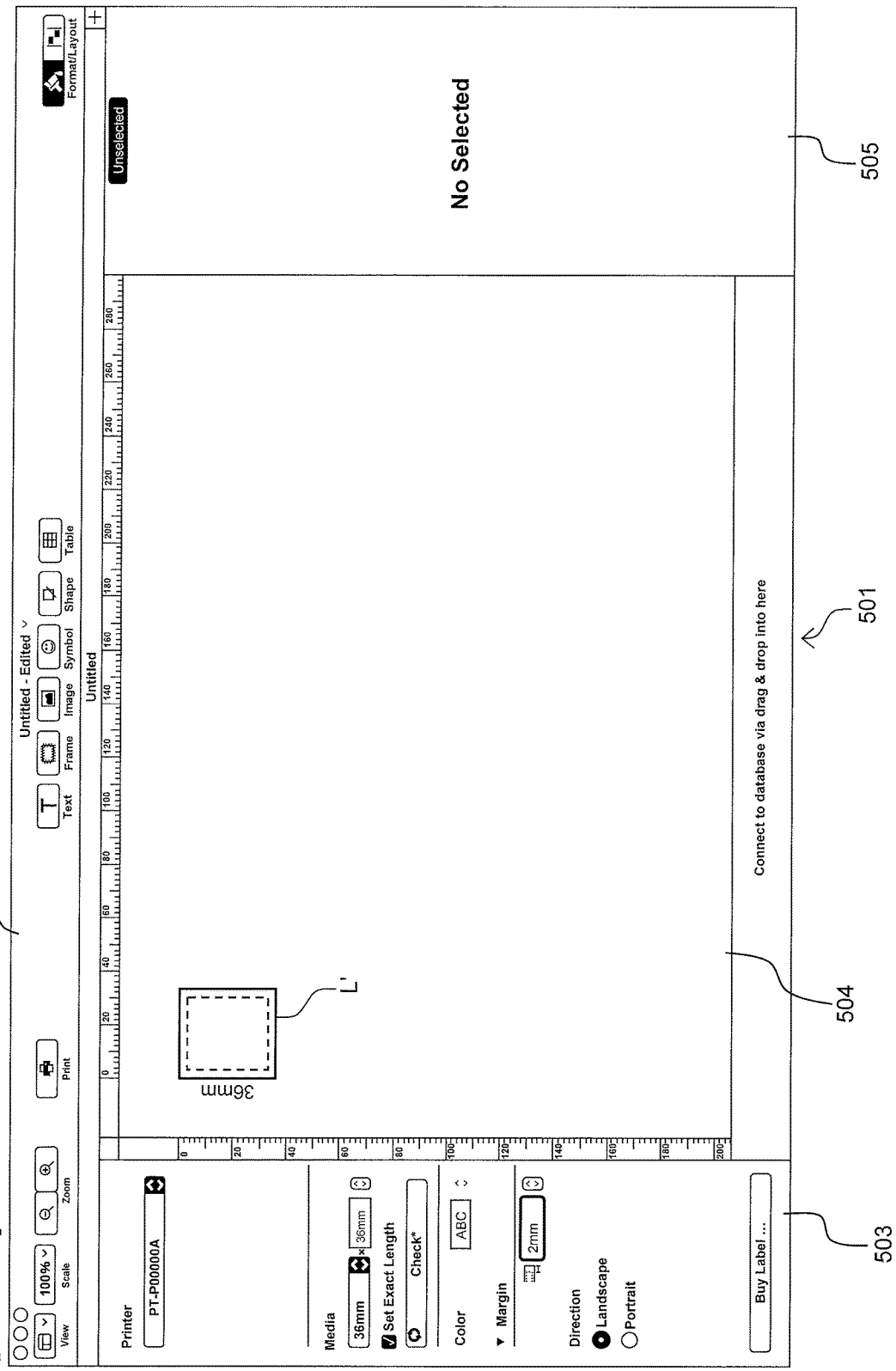

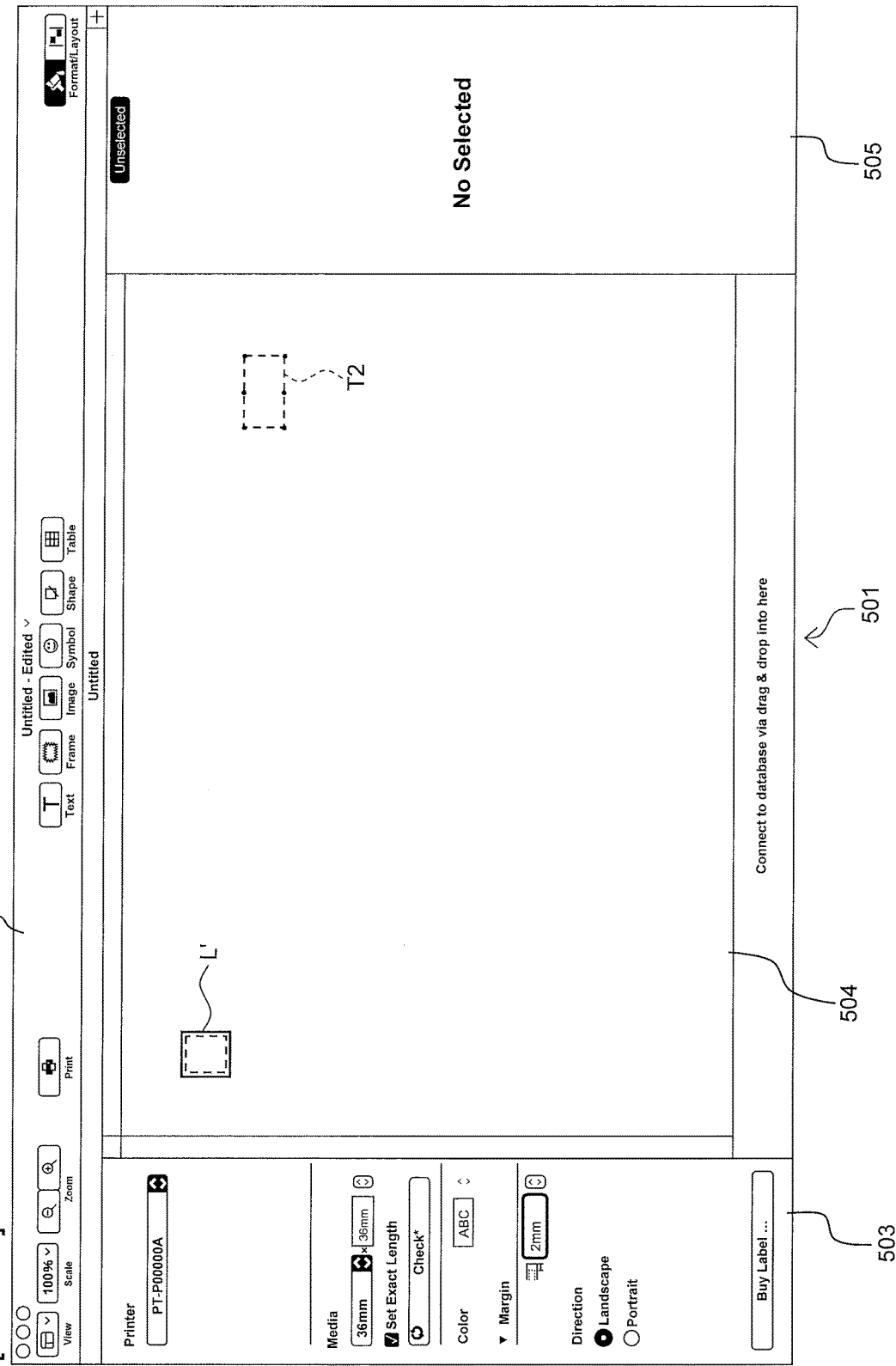
[FIG. 39]

RECORDING MEDIUM

CROSS-REFERENCE TO RELATED APPLICATION

The present application claims priority from Japanese Patent Application No. 2017-177955, which was filed on Sep. 15, 2017, the disclosure of which is incorporated herein by reference in its entirety.

BACKGROUND

Field

The present disclosure relates to a recording medium storing a printing processing program on an editing screen used for producing a text for print.

Description of the Related Art

Conventional printers producing a printed matter by forming a print on a print-receiving paper having two directions orthogonal to each other (e.g., a tape width direction and a tape length direction) include a printer connected to an editing apparatus capable of displaying an editing screen used for producing a text for print on a display unit.

In this case, an image of a print object including a text can be produced at a position separated from an image representing a print area etc. of the print-receiving paper.

Therefore, in the prior art, when an image of a print object including a produced text is inserted into an image representing a print area etc. of the print-receiving paper for editing, the image of the print object is displayed on the display screen such that drag and drop operations can be performed to the image representing a print area etc.

However, unless the drop operation is performed after the drag operation, a state of arrangement cannot be confirmed between the image of the print object at the drop position and the image representing the print area etc., so that a large operation effort makes the technique described above inconvenient.

SUMMARY

An object of the present disclosure is to provide a recording medium storing a printing processing program capable of easily confirming how an appearance looks when a desired text object is arranged on a printed matter at the time of editing.

In order to achieve the above-described object, according to the aspect of the present application, there is provided a non-transitory computer-readable recording medium storing a printing processing program for executing steps on a CPU of an editing apparatus that is connected to a printer configured to produce a printed matter by forming a print on a print-receiving paper having a first direction and a second direction orthogonal to each other and that has a display device, an operation device, and the CPU, the steps comprising an editing screen display step for controlling the display device to display an editing screen that includes an appearance virtual image of the printed matter and is for editing at least a print object, a drag operation determination step for determining whether or not, among the print object displayed in the editing screen, a text object composed of a text editing area frame and a text arranged inside the text editing area frame, or the text editing area frame, is moved by a drag operation via the operation device and arranged on an extended line of the appearance virtual image in the first direction, and a first virtual image expansion step for controlling the display device to expand the appearance virtual image displayed on the editing screen along the first direction to include at least a portion of the text object or the text editing area frame arranged on the extended line, in the case that it is determined in the drag operation determination step that the text object or the text editing area frame is arranged on the extended line of the appearance virtual image.

BRIEF DESCRIPTION OF THE DRAWINGS

FIG. 1 is a system configuration view schematically showing a printing system executing a printing processing program of an embodiment of the present disclosure.

FIG. 2 is a functional block diagram showing detailed functions of parts of the printing system.

FIG. 3 is an explanatory view of a display example of a setting screen (initial screen before text input) displayed on a display part.

FIG. 4A is an explanatory view of a display example showing a state in which a text object is produced outside an appearance virtual image.

FIG. 4B is an explanatory view of a display example showing a state in which the text object is dragged and dropped to the appearance virtual image.

FIG. 32 is an explanatory view of a display example showing a state in which a text body is contained to follow the text editing area frame included (dropped) in the appearance virtual image in Modification Example 1.

FIG. 33 is an explanatory view of a display example while only the text editing area frame of the text object is dragged toward the right side of the screen in Modification Example 2.

FIG. 34 is an explanatory view of a display example while only the text editing area frame of the text object is further dragged toward the right side of the screen in Modification Example 2.

FIG. 35 is an explanatory view of a display example showing a state in which a portion of the text editing area frame dragged toward the appearance virtual image has reached the extended line of the appearance virtual image in the tape length direction in Modification Example 2.

FIG. 36 is an explanatory view of a display example showing a state of the appearance virtual image expanded in the tape length direction to include the text editing area frame in Modification Example 2.

FIG. 37 is an explanatory view of a display example showing a state in which the text editing area frame included in the appearance virtual image is detached to the outside from the appearance virtual image in Modification Example 2.

FIG. 38 is an explanatory view of a display example showing a state in which the appearance virtual image in a first state is displayed after the detachment in Modification Example 2.

FIG. 39 is an explanatory view of a display example showing a reduced state of (an input information display area of) an editing screen in Modification Example 3.

DETAILED DESCRIPTION OF THE PREFERRED EMBODIMENTS

Figure 5:
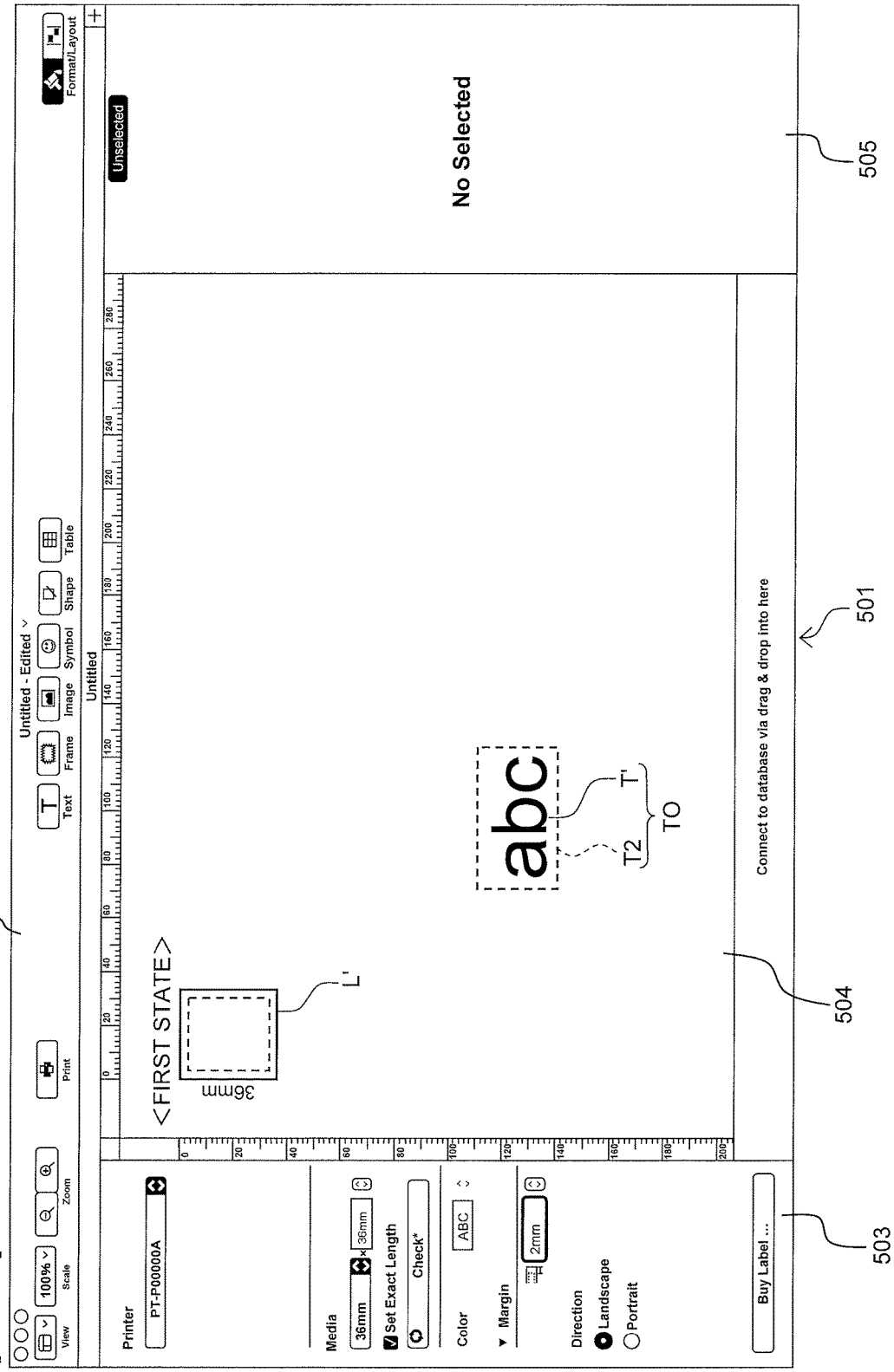
FIG. 5 is an explanatory view of a display example showing a state in which a text object is produced outside the appearance virtual image in a first example.

An embodiment of the present disclosure will now be described with reference to the drawings.
<Schematic Configuration of System>

An overall configuration of a printing system executing a printing processing program of this embodiment will be described with reference to FIGS. 1 and 2. In FIG. 1, a printing system 1 has (multiple) operation terminals 2 as editing apparatuses and (multiple) label printers 3 as printers. The (multiple) operation terminals 2 and the (multiple) label printers 3 are connected in a mutually communicable manner through a communication network NW such as a wired or wireless local area network (LAN) connection, for example.

<Basic Function of Operation Terminals 2>

For each of the operation terminals 2, for example, a general-purpose personal computer called a notebook or desktop type can be used. The operation terminal 2 generates various pieces of information including print information related to content editing such as input of a desired text and printing condition setting, as well as printing operations such as execution of printing, input through an operator's operation for printing by the label printers 3. In the case that the same or different multiple models of the label printers 3 is connected to the communication network NW, the operation terminal 2 can selectively operate any one of the multiple models of the label printers 3 through the communication network NW.

<Basic Function of Label Printers 3>

Each of the label printers 3 produces a print label (described later) according to various pieces of information including the print information generated by the operation terminal 2 based on an operator's operation. The label printer 3 can produce a print label (described later) having an arbitrary tape length by using a print-receiving tape (described later) having a desired tape width wound around a tape roll or a tape cartridge (described later) attached to the label printer 3. To the label printer 3, multiple kinds of tape rolls or tape cartridges corresponding to the type of print-receiving tape can be detached and attached in a replaceable manner. Therefore, the operator can arbitrarily select and use the print-receiving tape of a desired type of tape width. The tape cartridge is, for example, a member (product) having a tape roll stored in a housing etc. Therefore, although only the tape roll is use in the following description, the tape roll can be replaced with the tape cartridge.

<Basic Configuration of Operation Terminal 2>

As shown in FIG. 2, the operation terminal 2 includes a CPU (computing device) 12, a memory 13 composed of, for example, a RAM and a ROM, an operation part (operation device) 14 operated by an operator, a display part (display device) 17 such as a monitor, a communication control part 15 controlling transmission and reception of various pieces of information to/from the label printer 3, and a mass storage device 16 storing various programs etc. The various programs etc. stored in the mass storage device 16 will be described later.

The CPU 12 executes various processes and processes the transmission and reception of various pieces of information to/from the label printer 3, while using a temporary storage function of the RAM serving as the memory 13, according to the program stored in advance in the ROM serving as the memory 13 and the mass storage device 16.

<Basic Configuration of Label Printer 3>

As shown in FIG. 2, the label printer 3 has a tape roll holder part 210 enabling attachment and detachment of a tape roll 204 around which a print-receiving tape 203 serving as a print-receiving paper is wound (although the tape is actually wound into a spiral shape such that the tape can be fed out, the tape is simplified in the figure and partially shown as concentric shade lines), a printing head 205 performing a desired print on the print-receiving tape 203 fed out from the tape roll 204, a cutter 207 cutting the print-receiving tape 203 after the print at a desired tape length into a print label L, a feeding device 209 disposed to face the printing head 205 and controlled by a control circuit 202 to feed the print-receiving tape 203 fed out from the tape roll 204. The control circuit 202 is connected to a communication control part 208 for connecting to the communication control part 15 of the operation terminal 2 through the communication network NW. Consequently, the label printer 3 can transmit and receive various pieces of information to/from the operation terminal 2.

<Editing Application (Printing Processing Program)>

In the printing system 1 of this embodiment, an operator operating the operation terminal 2 can use an editing application (printing processing program) that is one of the various programs stored in the mass storage device 16 serving as a recording medium, to perform the content editing such as input of a desired text printed on the print label L and the printing condition setting as well as the printing operations such as execution of printing.

When the operator activates the editing application on the operation terminal 2, for example, an editing screen 501 as shown in FIG. 3 is displayed on the display part 17. The editing screen 501 displays a selection area 502 including multiple operation icons displayed for various purposes for producing the print label L in an upper portion of the screen, a label dimension setting area 503 including label dimension setting of the print label L on the lower left side of the screen, an input information display area 504 including vertical and horizontal scales and a display of an appearance virtual image L' (and a text editing area frame T2) having label dimensions set in accordance with the scales in the center of a lower portion of the screen, and a sub-setting area 505 in which a setting menu is displayed as appropriate in accordance with a mode etc. After the display of the editing screen 501, a screen display state changes to a screen for editing a text object (described later) to be arranged on the print-receiving tape 203 at the time of production of the print label L.

<Display of Display Areas>

The selection area 502 of the editing screen 501 enables, for example, display setting (View) for setting an overall display format of the editing screen 501, scale setting (Scale) for setting a display magnification of a text object etc., zoom setting (Zoom) for setting scaling, print (Print) for performing printing, etc., as well as various settings such as text input, image pasting, chamfering, etc.

The label dimension setting area 503 of the editing screen 501 enables, for example, label dimension setting (Media) and margin dimension setting (Margin) of the print label L.

In the following description, label and margin dimensions set by an operator immediately before text input in the label dimension setting area 503 are referred to as "dimension initial setting". In the dimension initial setting shown in FIG. 3, initial setting is made to a tape width of 26 mm, a tape length of 36 mm, and a margin of 2 mm.

With this setting, the CPU 12 displays in the input information display area 504 of the editing screen 501 the appearance virtual image L' virtually representing the print label L based on the dimension initial setting described above in accordance with the scales.

As a result, the operator can directly input a text (such as characters) inside the appearance virtual image L' by operating the operation part 17. In this way, the appearance virtual image L' having a desired width (e.g., 36 mm) is drawn by a solid line etc. in the input information display area 504 of the editing screen 501.

On the other hand, in addition to directly inputting such a text into the appearance virtual image L', the operator can display, for example, a text editing area frame T2 having a desired size by a broken line (or a chain line etc.) as shown in FIG. 4A, for example, and can arrange inside this text editing area frame T2 a text main body T' composed of a text (e.g., "abc") input by the operator operating the operation part 17. The text editing area frame T2 and the text body T' constitute a text object TO that is a print object.

Additionally, the operator can operate a mouse not shown of the operation part 17 to perform, for example, an operation of moving the mouse while pressing a left button of the mouse with a mouse pointer P pointing at the text object TO, i.e., a so-called drag operation, to move the text object TO.

As a result, as shown in FIG. 4B, the operator can move the text object TO to the inside of the appearance virtual image L' by the drag operation and can perform a drop operation of releasing the left button of the mouse to arrange the text object TO inside the appearance virtual image L'. After this drop operation is performed, the text editing area frame T2 is displayed inside the appearance virtual image L'.

Therefore, in this embodiment, in addition to the case that the text object TO is produced by directly inputting a text (such as characters) inside the appearance virtual image L', the text object TO separately produced outside the appearance virtual image L' can be dragged into and arranged inside the appearance virtual image L'.

In the case that the text editing area frame T2 is separately displayed outside the appearance virtual image L' to accept text input also in this separate text editing area frame T2 and that the text object TO is inserted by the drag and drop operation to the inside of the appearance virtual image L' as described above, the convenience can be improved if the drop position of the text object TO produced outside the appearance virtual image L' can be arranged regardless of the appearance virtual image L' and, furthermore, how the appearance looks in this case can be confirmed without the drop operation.

Therefore, in this embodiment, as described later in detail with reference to a flow of FIG. 12, for the CPU 12 of the operation terminal 2 that is configured to be connectable to the print label producing apparatus 3 producing the print label L by forming a print on the print-receiving tape 203 having a first direction (e.g., a tape length direction) and a second direction (e.g., a tape width direction) orthogonal to each other and that has the display part 17, the operation part 14, and the CPU 12, a printing processing program is executed to cause the CPU 12 to perform: an editing screen display procedure for controlling the display part 17 to display the editing screen 501 including the appearance virtual image L' of the print label L and editing a print object; a drag operation determination procedure for determining whether or not, out of the print object displayed in (a region of the input information display area 504 at a position out of the appearance virtual image L' of) the editing screen 501, the text object TO composed of the text editing area frame T2 and the text main body T' (such as characters "abc") arranged inside the text editing area frame T2, or the text editing area frame T2 of the text object TO, is moved by the drag operation through the operation part 14 and arranged on an extended line of the appearance virtual image L' in the first direction; and a first virtual image expansion procedure for, in the case that the text object TO or the text editing area frame T2 is determined in the drag operation determination procedure as being arranged on the extended line of the appearance virtual image L', controlling the display part 17 to expand the appearance virtual image L' displayed on the editing screen 501 in the first direction to include at least a portion of the text object TO or the text editing area frame T2 arranged on the extended line.

Specifically, for example, the operator performing the editing may want to know how the appearance looks when the desired text object TO is actually arranged on the print label L in some cases. Therefore, when the printing processing program is executed, the drag operation determination procedure and the first virtual image expansion procedure are performed. Specifically, the editing screen 501 displayed at the editing screen display procedure includes the appearance virtual image L' of the print label L. After producing the desired text object (outside the appearance virtual image L' on the editing screen 501) as described above, the operator performs a drag operation of the text object TO or the text editing area frame T2 onto the extended line of the appearance virtual image in the first direction (e.g., on the right side of the of the print-receiving tape 203 in the tape length direction (left-right direction on the screen)). This leads to an affirmative determination of the drag operation determination procedure. At the same time, in the first virtual image expansion procedure, the appearance virtual image L' of the editing screen 501 expands in the first direction to includes at least a portion of the text object TO or the text editing area frame T2 on the extended line in the first direction. Being on the extended line extended toward the right side of the appearance virtual image L' defined as the first direction is referred to as "being on the right extended line".

Example 1

FIGS. 5 to 11 show a display example in the case that the text object TO is pasted to the appearance virtual image L' without the drop operation described above.

In FIG. 5, the appearance virtual image L' based on the initial setting is displayed in the input information display area 504 of the editing screen 501 (first state). At the same time, the text object TO composed of the text editing area frame T2 and the text main body T' is displayed at a position away from the appearance virtual image L' in the input information display area 504. Since the text body T' is a text input by the operator operating the operation part 17, only the text editing area frame T2 of a predetermined size is displayed before input, and the length of the text editing area frame T2 is extended in the tape length direction as the text is input (the number of characters increases or decreases). A size, a type, etc. of font in this case are based on a separate font setting. The text editing area frame T2 may be displayed, for example, when the operator operates the mouse serving as the operation part 17 to specify an appropriate position of the input information display area 504 as an input position. Alternatively, when the operator operates the mouse serving as the operation part 17 to specify an appropriate position of the input information display area 504 as an input position, a cursor (not shown) for text input may be displayed, and the text editing area frame T2 may be displayed in conjunction with the input of text at the cursor position.

Figure 6:
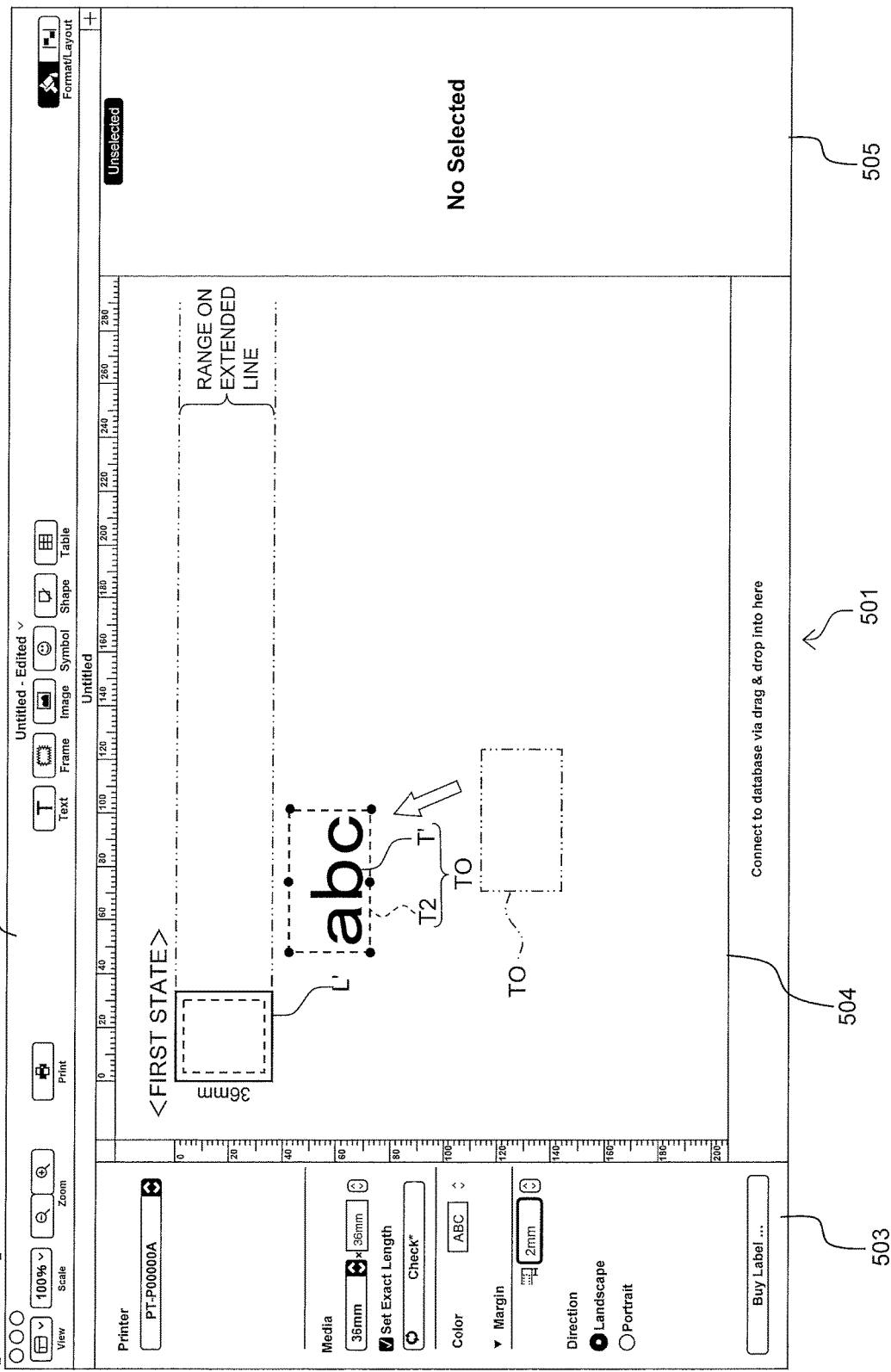
FIG. 6 is an explanatory view of a display example during a drag operation of the text object toward the appearance virtual image in the first example.
Figure 7:
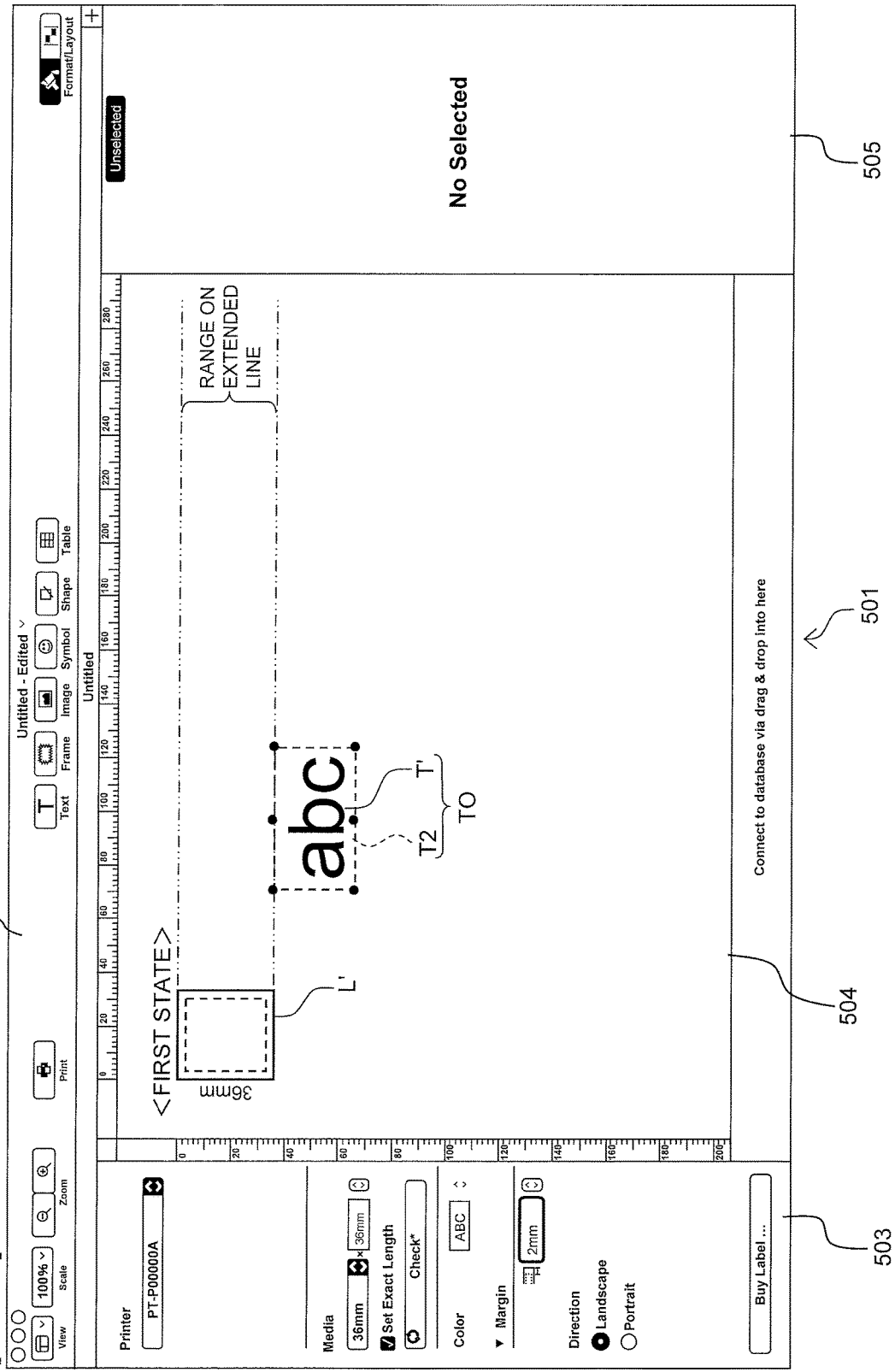
FIG. 7 is an explanatory view of a display example showing a state in which a portion of the text object dragged toward the appearance virtual image has reached an extended line of the appearance virtual image in a tape length direction in the first example.
Figure 8:
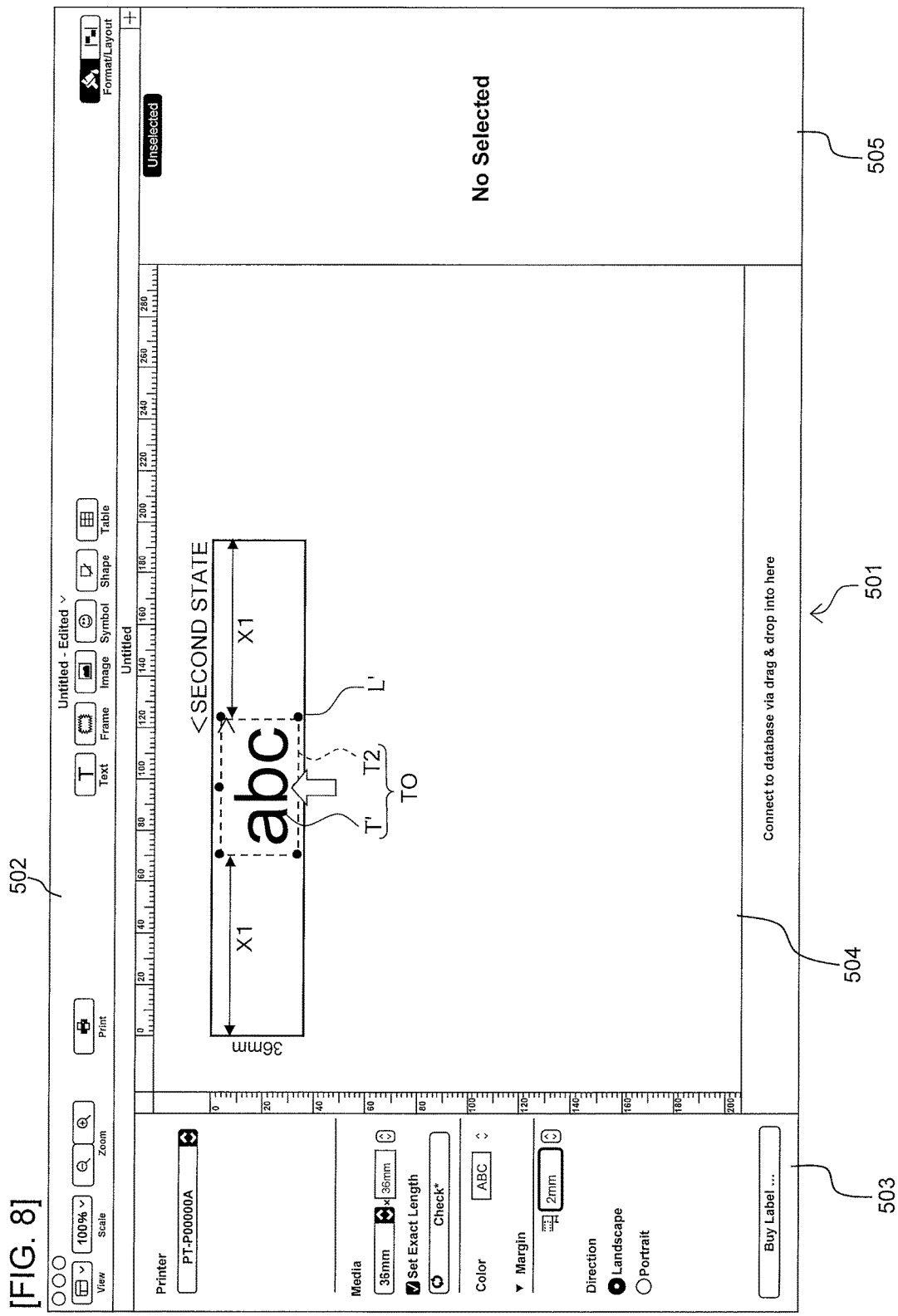
FIG. 8 is an explanatory view of a display example showing a state of the appearance virtual image expanded in the tape length direction to include the text object in the first example.

Subsequently, with the mouse pointer positioned within the frame of the text editing area frame T2, as shown in FIG. 6, the operator performs the drag operation of the text object TO toward the upper side of the screen (toward the appearance virtual image L'), and, for example, as shown in FIG. 7, when an upper edge of the text object TO reaches within a range on the right extended line of the appearance virtual image L' (or comes into contact with a lower edge on the right extended line), the appearance virtual image L' expands in the tape length direction to include the dragged text object TO as shown in FIG. 8 (second state).

In this state, the appearance virtual image L' is expanded such that a length of a left margin away from the left edge of the text object TO of the appearance virtual image L' and a length of a right margin away from the right edge of the text object TO of the appearance virtual image L' are both made equal to X1, or in other words, the text object TO is centered in the appearance virtual image L'.

In this state, since the drop operation of the text object TO is not performed to the appearance virtual image L', the operator can continuously freely move the text object TO.

Figure 9:
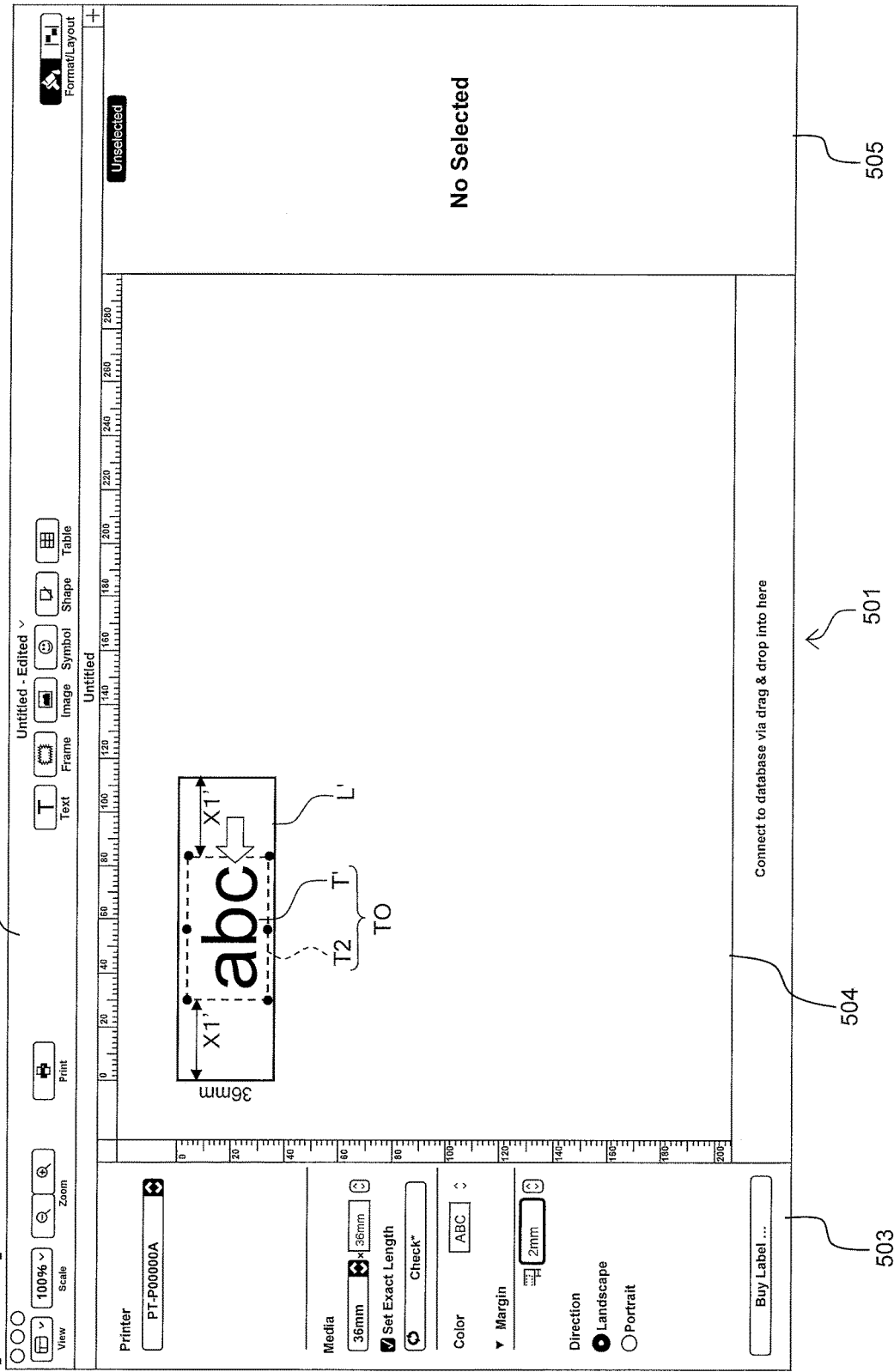
FIG. 9 is an explanatory view of a display example showing a state in which the appearance virtual image is expanded and contracted in conjunction with a drag operation along the tape length direction such that the text object is included in the appearance virtual image in the first example.

Specifically, as shown in FIG. 9, when the operator performs the drag operation of the text object TO along the tape length direction of the appearance virtual image L' with at least a portion thereof included in the appearance virtual image L' to move the text object TO, for example, to the left side of the appearance virtual image L' (see white arrow), the length of the left margin and the length of the right margin of the appearance virtual image L' for the text object TO are both adjusted and made equal to X1, and consequently, a change such as shortening the entire length of the appearance virtual image L' can continuously be made.

Figure 10:
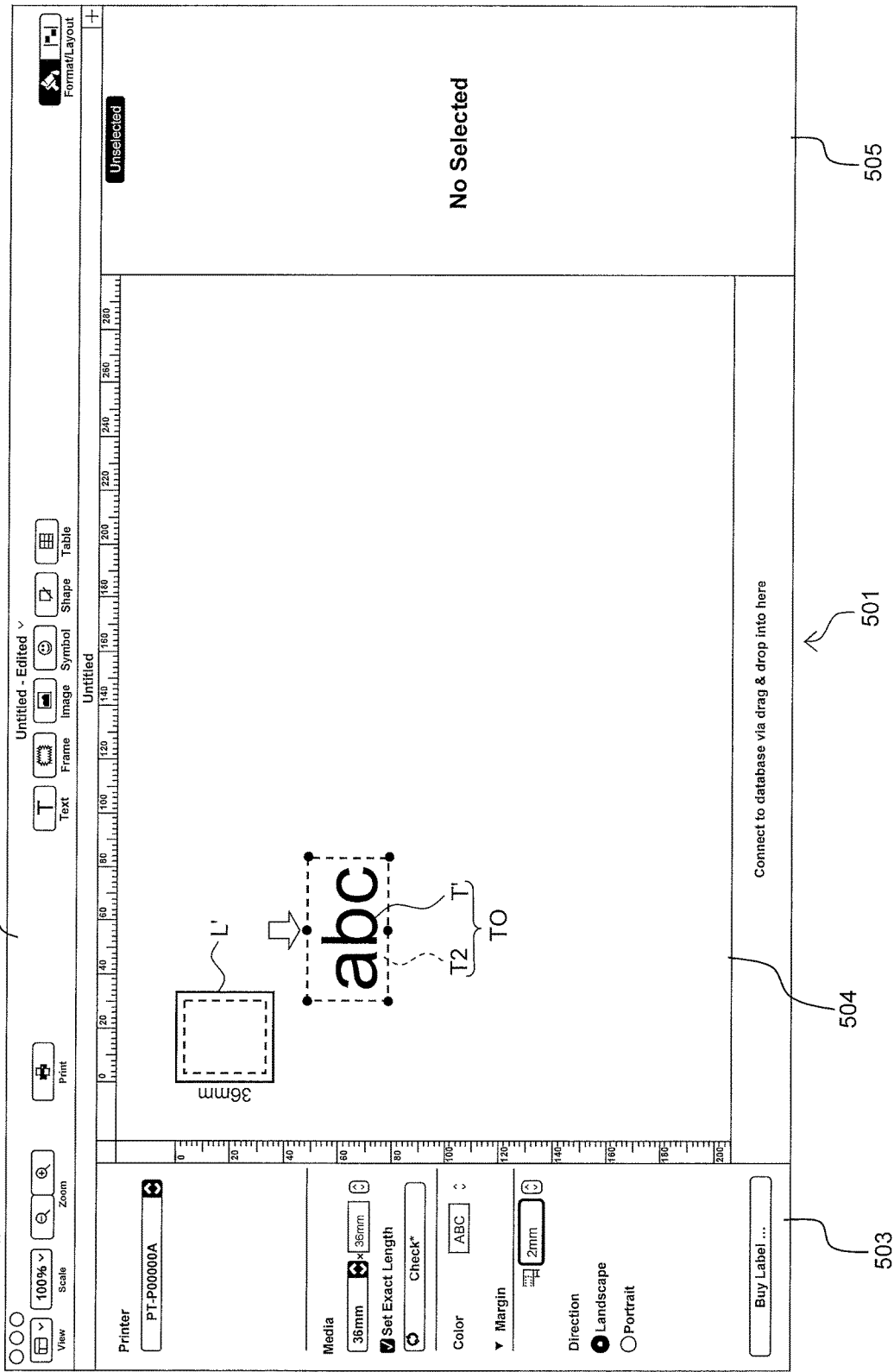
FIG. 10 is an explanatory view of a display example showing a state in which the text object is detached from the appearance virtual image in the first example.

As shown in FIG. 10, when the text object TO is dragged downward from the state shown in FIG. 8 or 9 and detached to the outside of the appearance virtual image L' again, the appearance virtual image L' is immediately contracted, returning to the length of the original state (the state shown in FIG. 5).

Figure 11:
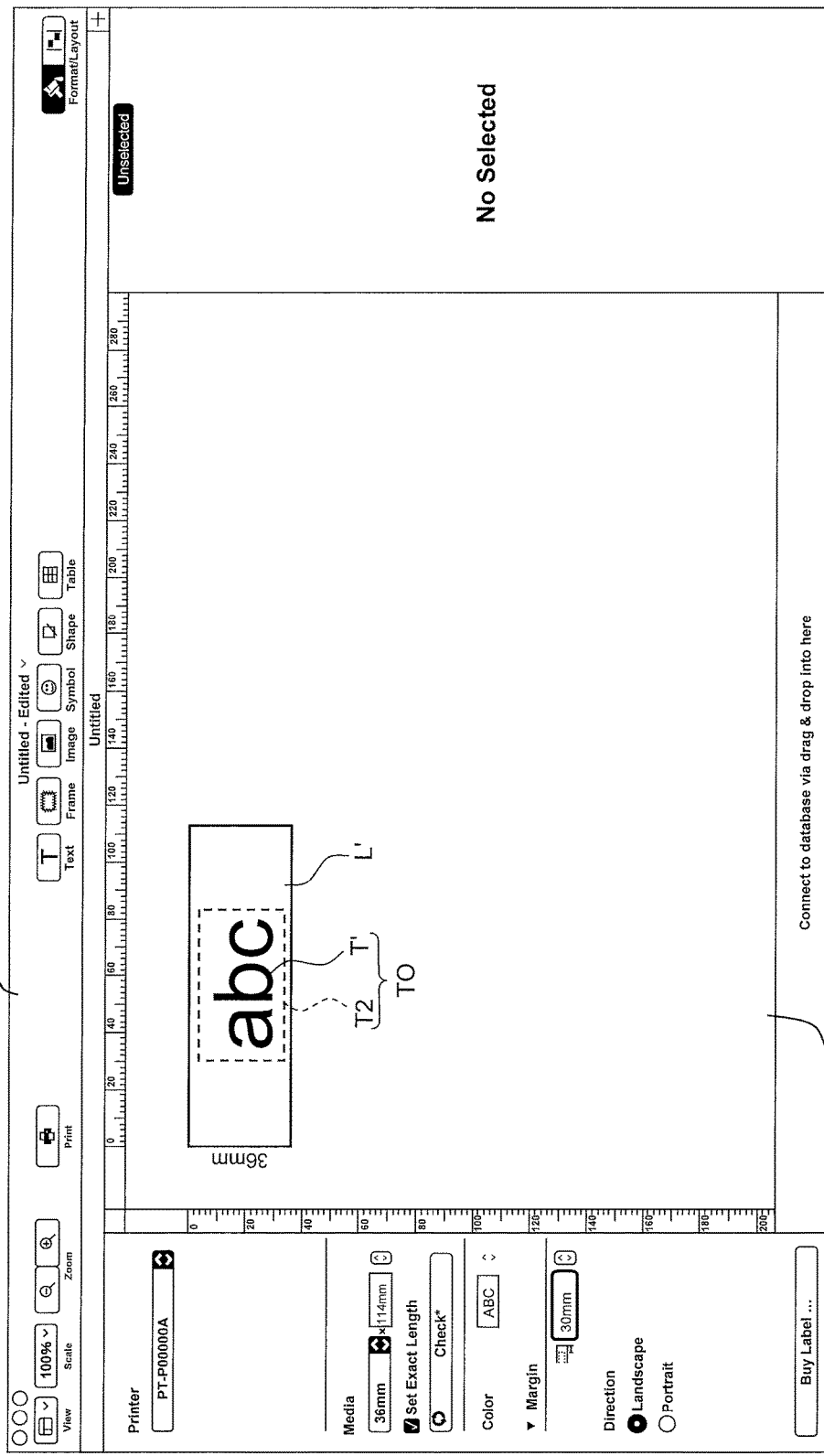
FIG. 11 is an explanatory view of a display example showing a state in which the text object is dropped to the appearance virtual image in the first example.

On the other hand, when a drop operation is performed with the mouse in the state shown in FIG. 11, the text object TO can be pasted (combined on the screen) to the appearance virtual image L'. As a result, for example, among label sizes of the dimension initial setting, a label dimension and a margin dimension in the tape length direction can automatically be changed. Additionally, for example, by changing the label dimension setting (Media) or the margin dimension setting (Margin) of the print label L from this state in the label dimension setting area 503, a fine adjustment etc. can be made to numerically change the appearance virtual image L' in the expanded state. Similarly, for example, the mouse pointer can be positioned at the right end of the appearance virtual image L' to make a fine adjustment etc. for apparently expanding and contracting the appearance virtual image L'. In this case, the left and right margins are evenly maintained as described above. In the above description, for example, the initial setting is made such that the text object TO is centered with respect to the appearance virtual image L'; however, for example, the object may be right-aligned so that the right margin remains unchanged according to the initial setting.

In this way, in the case that the appearance virtual image L' in the state before expansion is displayed on the editing screen 501 and that the one text object TO located outside the appearance virtual image L' is moved and arranged on the right extended line of the appearance virtual image L', the appearance virtual image L' can be expanded in the first direction to include the one text object TO located on the right extended line, and the adjustment can be made such that the margins on one and the other sides of the one text object TO have an equal length in the appearance virtual image L' expanded in the first direction.

As shown in FIG. 10, in the case that the one text object TO included in the appearance virtual image L' is detached to the outside of the appearance virtual image L' by the drag operation through the operation section 14 while the appearance virtual image L' is in the expanded state (regardless of whether the drop operation is performed), the appearance virtual image L' can be returned from the expanded state to the state before the expansion.

An example of an image processing routine executed by the CPU 12 to implement the technique will be described with reference to the flowchart of FIG. 12. In the following description, description will be made of an example of the control routine according to the CPU 12 after the operator activates the editing application on the operation terminal 2.

First, the CPU 12 executes an editing screen display procedure for displaying the editing screen 501 on the display part 17 and waits for the next operation by the operator (step S1). Specifically, in the editing screen display procedure of step S1, the CPU 12 displays on the display part 17 the editing screen 501 for editing the text object TO to be arranged on the print-receiving tape 203. As a result, the operator can perform an appropriate editing operation (such as initial setting and text input) on the operation part 17, while referring to the editing screen 501, to create the desired text object TO outside the appearance virtual image L'. Although the operator can perform various operations etc. after displaying the editing screen 501 on the display part 17, these operations will not be described.

When the operator performs the drag operation of the text object TO displayed on the editing screen 501 with the operation part 14, the CPU 12 accepts the drag operation and moves the text object TO in conjunction with the drag operation (step S2).

The CPU 12 then determines whether or not the text object TO is arranged within the frame of the appearance virtual image L' (step S3). In the case that the text object TO is determined as being arranged within the frame of the appearance virtual image L' (YES), the CPU 12 shifts the process to step S4. On the other hand, in the case that the text object TO is determined as not being arranged within the frame of the appearance virtual image L' (NO), the CPU 12 shifts the process to step S10.

Specifically, the CPU 12 checks whether or not a text object TO different from the text object TO being dragged is already arranged within the frame of the appearance virtual image L'. In the following description, the text object TO already arranged within the frame of the appearance virtual image L' and different from the text object TO being dragged will be referred to as the "preceding text object TO". When the preceding text object TO is already arranged within the frame of the appearance virtual image L', the control of the length of the appearance virtual image L' is allowed to be performed for the text object TO being dragged in consideration of the preceding text object TO.

The CPU 12 then calculates a distance of a left margin from the left edge of the text object TO to the left edge (origin position) of the appearance virtual image L' according to the current position of the text object TO moved by the drag operation (or the preceding text object TO) by using, for example, a scale function in XY directions corresponding to the scales (the horizontal and vertical directions of the screen=the first and second directions) (step S4). The calculation of the left margin is a routine that is always calculated as long as a determination is negative at step S9 described later.

The CPU 12 then determines whether or not the text object TO moved by the drag operation is further moved so that at least a portion of the text object TO is dragged into the frame of the appearance virtual image L' (step S5). In the case that the text object TO is determined as being dragged into the frame of the appearance virtual image L' (YES), the CPU 12 shifts the process to step S7. On the other hand, in the case that the text object TO is determined as not being located within (dragged into) the frame of the appearance virtual image L' (NO), the CPU 12 shifts the process to step S6.

The CPU 12 then performs the drag operation determination procedure and determines whether or not the text object TO moved by the drag operation is further moved so that the text object TO is dragged onto the right extended line of the appearance virtual image L' in the first direction (step S6). In the case that the text object TO is determined as being located on (dragged onto) the right extended line (YES), the CPU 12 shifts the process to step S7. On the other hand, in the case that the text object TO is determined as not being located on (dragged onto) the right extended line (NO), the CPU 12 shifts the process to step S10.

The CPU 12 then acquires the length (e.g., X1) of the left margin calculated at step S4 for the text object TO moved by the drag operation (or the preceding text object TO) with respect to the appearance virtual image L' (step S7), and generates the appearance virtual image L' on the screen such that the text object TO moved by the drag operation is centered by adding a margin corresponding to the length of the left margin to the right side (step S8). In other words, the CPU 12 performs the first virtual image expansion procedure for controlling the display part 17 to expand the appearance virtual image L' displayed on the editing screen 501 in the first direction to include at least a portion of the text object TO arranged (dragged) onto the (right) extended line.

The CPU 12 then determines whether or not a drop operation is performed for the text object TO moved by the operator through the drag operation (step S9). In the case that the drop operation is determined as being performed (YES), the CPU 12 sets the appearance virtual image L' extended in the first direction from the initial state generated at step S6 as the changed appearance virtual image L', and in contrast, in the case that the drop operation is determined as not being performed (NO), the CPU 12 returns the process to step S4 to calculate the left margin according to the position of the text object TO moved in conjunction with the drag operation by the operator with respect to the appearance virtual image L' and provide the appearance virtual image L' having the right margin of the same length as the left margin until the drop operation is performed.

In this case, the operator does not necessarily move the text object TO only in the rightward direction in which the appearance virtual image L' expands along the first direction and, for example, after once making the appearance virtual image L' longer, the text object TO may be moved in the left direction in which the appearance virtual image L' contracts along the first direction. Therefore, the first virtual image expansion procedure at step S8 described above includes the case of shortening the appearance virtual image L' (i.e., adding a dimension on the minus side).

In the case that although the determination is affirmative (YES) at any routines of steps S3, S5, S6 during the previous drag operation, the current determination is negative (NO) at steps S3, S5, S6 in the repeated routines associated with the drag operation, the appearance virtual image L' is assumed to be in the second state. Therefore, the CPU 12 determines whether or not the appearance virtual image L' is in the second state (step S10), and in the case that the image is determined as being in the second state (YES), the appearance virtual image L' is returned to the first state (step S11), and in the case that the image is determined as not being in the second state (NO), the process is shifted to step S7. In this way, in the case that the text object TO inside the frame of the appearance virtual image L' or on the right extended line is detached therefrom while the appearance virtual image L' is in the second state, the CPU 12 may return the appearance virtual image L' to the original state (the first state).

Therefore, in the case that the one text object TO included in the appearance virtual image L' is detached from the appearance virtual image L' by the drag operation through the operation part 14 when the display part 17 is put into the second state in the first virtual image expansion procedure, the CPU 12 performs a first virtual image contraction procedure at step S11 for controlling the display part 17 to return from the second state to the first state.

Example 2

Example 2 will be described with reference to FIGS. 13 to 19. Example 2 shows a specific example in the case that the "preceding text object TO" is already arranged in the appearance virtual image L' at step S3 processed by the CPU 12 of Example 1. Therefore, the same portions as those described above will not be described.

Figure 13:
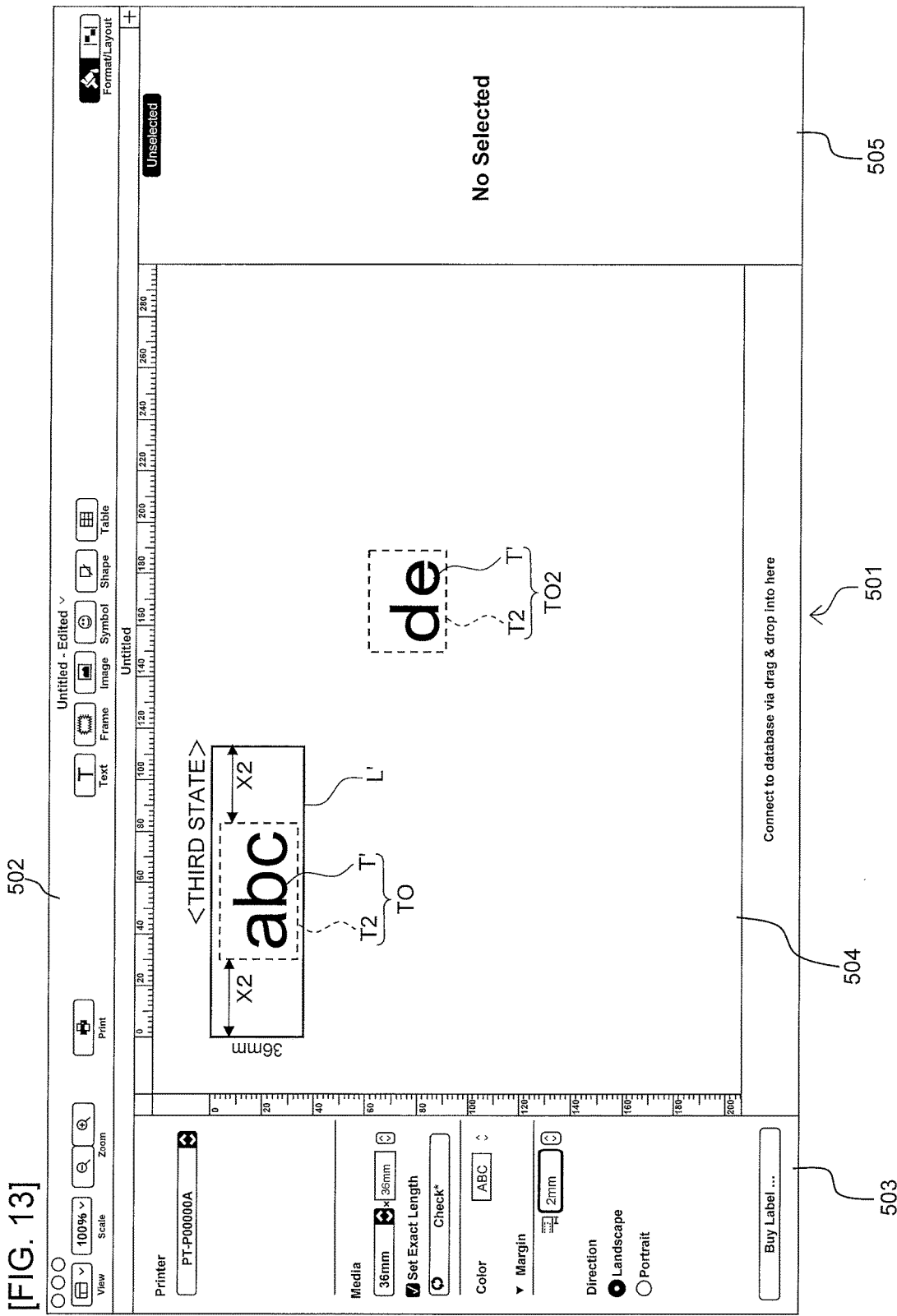
FIG. 13 is an explanatory view of a display example showing a state in which another text object is produced outside the appearance virtual image while the text object is already arranged in the frame of the appearance virtual image in a second embodiment.

For example, as shown in FIG. 13, it is assumed that while the preceding text object TO having the text body T' composed of a text "abc" arranged in the text editing area frame T2 is arranged in the appearance virtual image L' (third state, the left and right margins are both X2), the operator produces another text object TO2 having the text body T' composed of a text "de" arranged in the text editing area frame T2, on the outside of the appearance virtual image L'.

Figure 14:
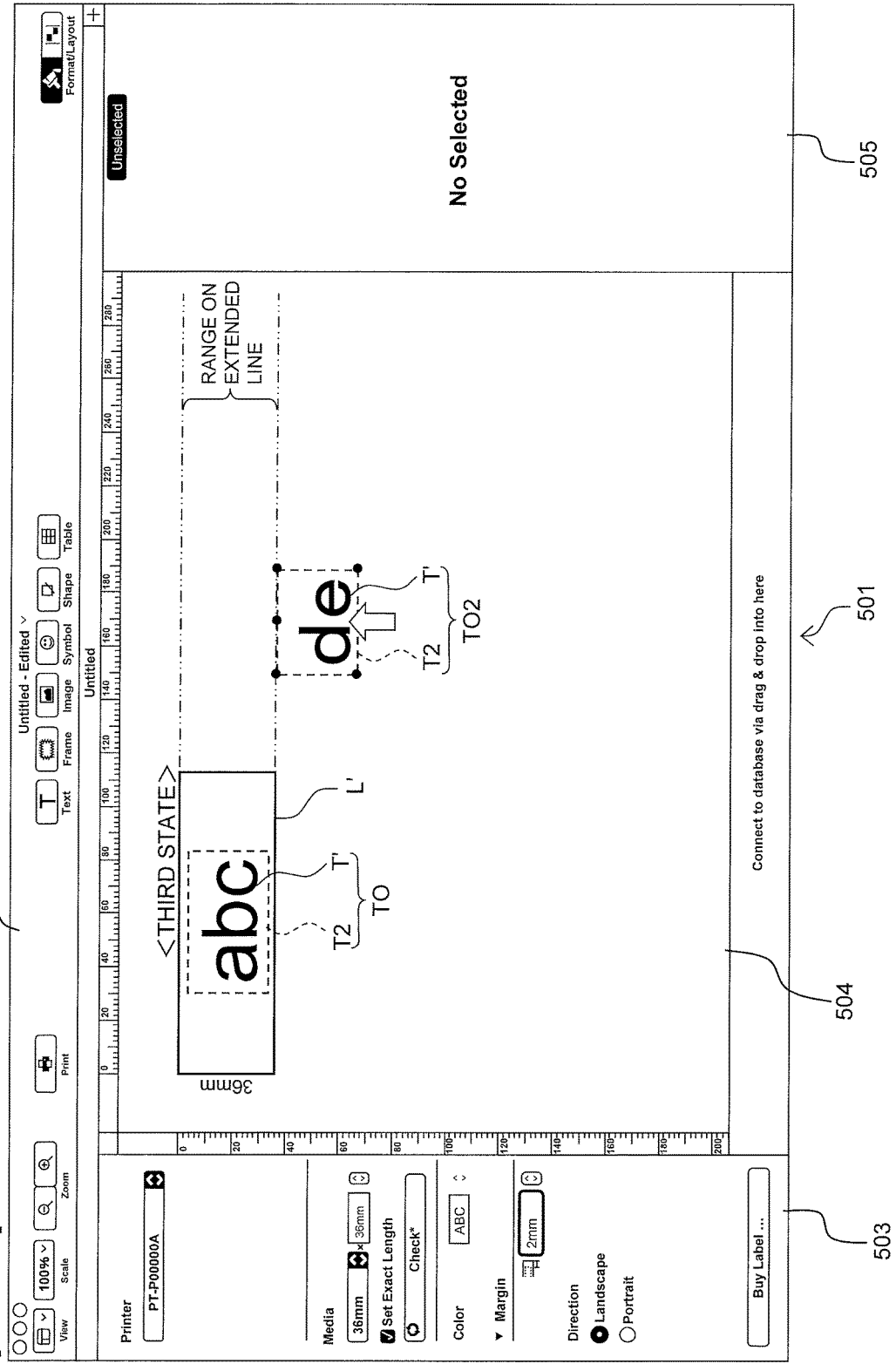
FIG. 14 is an explanatory view of a display example showing a state in which a portion of the other text object dragged toward the appearance virtual image has reached the extended line of the appearance virtual image in the tape length direction in the second example.
Figure 15:
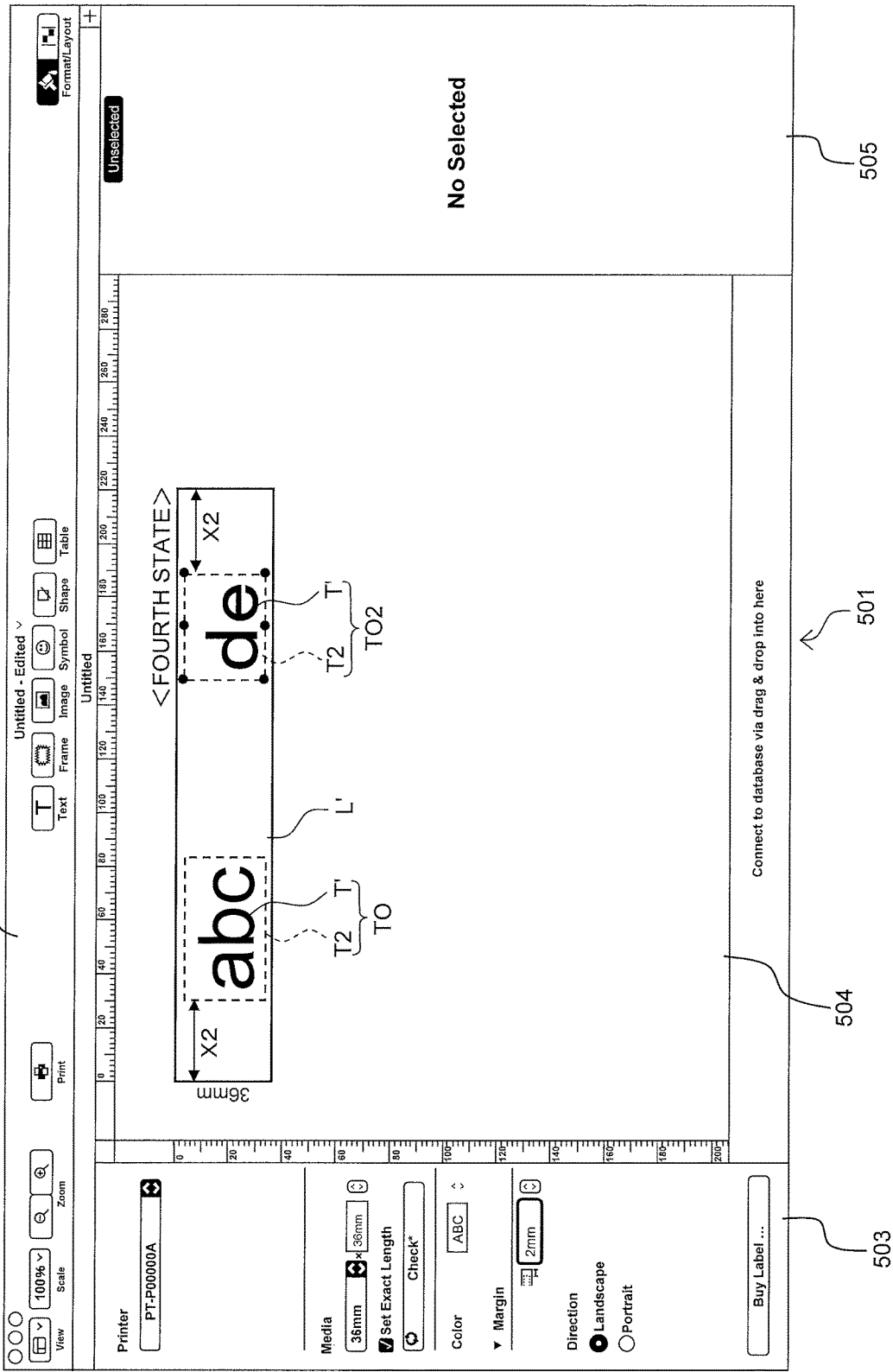
FIG. 15 is an explanatory view of a display example showing a state in which the appearance virtual image is expanded in the tape length direction such that the other text object is included at a position separated from the right side of the preceding text object in the second embodiment.

Subsequently, with the mouse pointer positioned within the frame of the text editing area frame T2, the operator performs the drag operation of the text object TO2 toward the upper side of the screen (toward the appearance virtual image L'), and, for example, as shown in FIG. 14, when an upper edge of the text object TO2 reaches within a range on the right extended line of the appearance virtual image L' (or comes into contact with a lower edge on the right extended line), the appearance virtual image L' expands in the tape length direction from the third state to include both the preceding text object TO and the dragged text object TO2 as shown in FIG. 15 (fourth state).

In this state, the appearance virtual image L' is expanded such that the length of the left margin away from the left edge of the text object TO of the appearance virtual image L' and the length of the right margin away from the right edge of the text object TO2 of the appearance virtual image L' are both made equal to X2.

In this state, since the drop operation of the text object TO2 is not performed to the appearance virtual image L', the operator can continuously freely move the text object TO.

Figure 16:
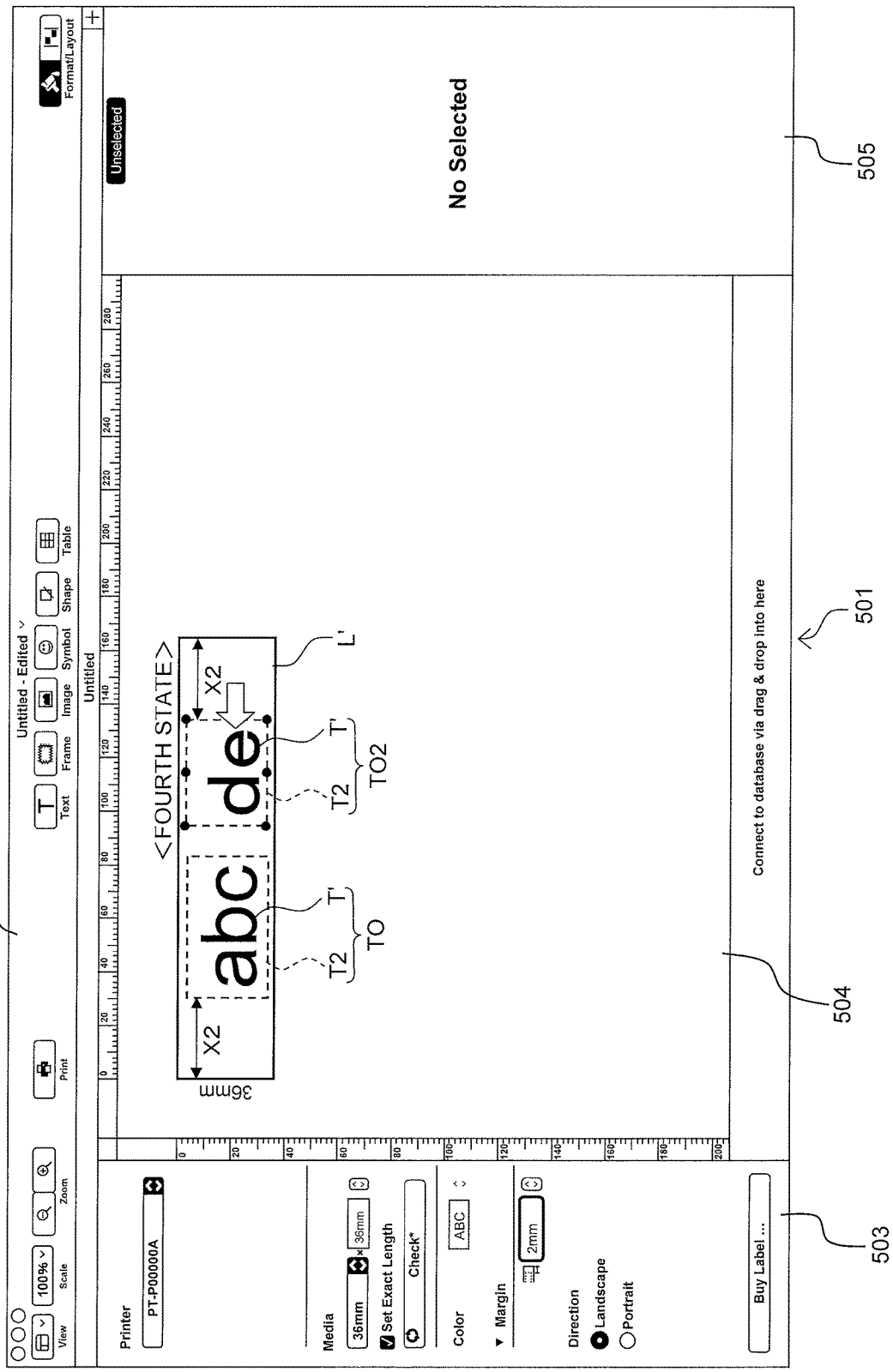
FIG. 16 is an explanatory view of a display example showing a state in which the appearance virtual image is expanded and contracted in conjunction with a drag operation along the tape length direction such that the other text object approaches the preceding text object while being included in the appearance virtual image in the second example.

Specifically, as shown in FIG. 16, when the operator performs the drag operation of the text object TO2 along the tape length direction of the appearance virtual image L' with at least a portion thereof included in the appearance virtual image L' to move the text object TO, for example, to the left side of the appearance virtual image L' (see white arrow), the length of the left margin and the length of the right margin of the appearance virtual image L' including both the text object TO and the text object TO2 are both adjusted and made equal to X2, and consequently, a change such as shortening the entire length of the appearance virtual image L' can continuously be made.

Figure 17:
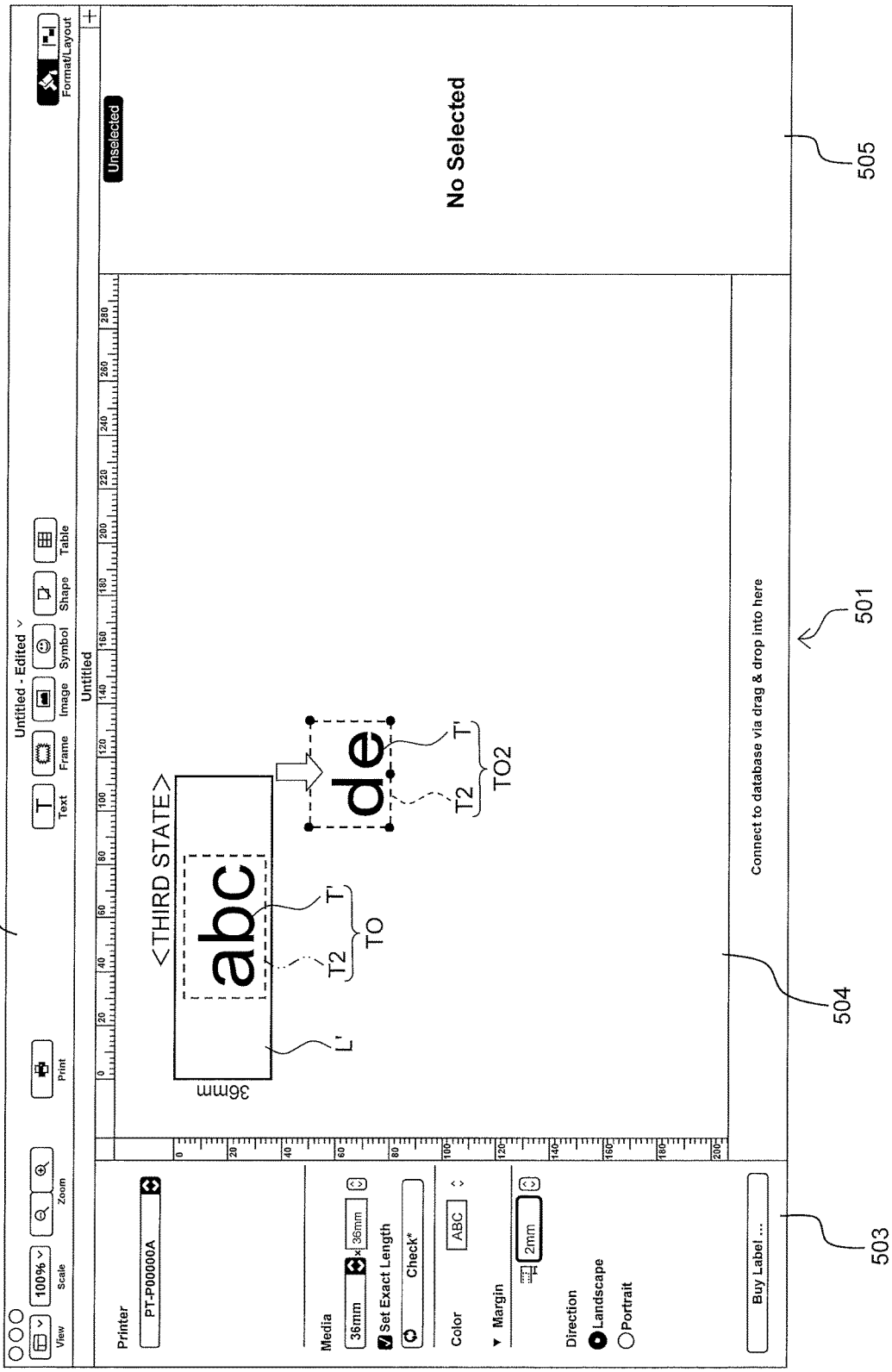
FIG. 17 is an explanatory view of a display example showing a state in which the other text object is detached from the appearance virtual image while leaving the preceding text object in the second example.

As shown in FIG. 17, when the text object TO2 is dragged downward from the fourth state shown in FIG. 15 or 16 and detached to the outside of the appearance virtual image L' again, the appearance virtual image L' is immediately contracted, returning to the length of the original third state in which the preceding text object TO is centered. In this case, the flow shown in FIG. 12 is performed with the "second state" of step S10 replaced with the "fourth state" and the "first state" of step S11 replaced with the "third state". In this case, step S11 corresponds to the second virtual image contraction procedure.

Figure 18:
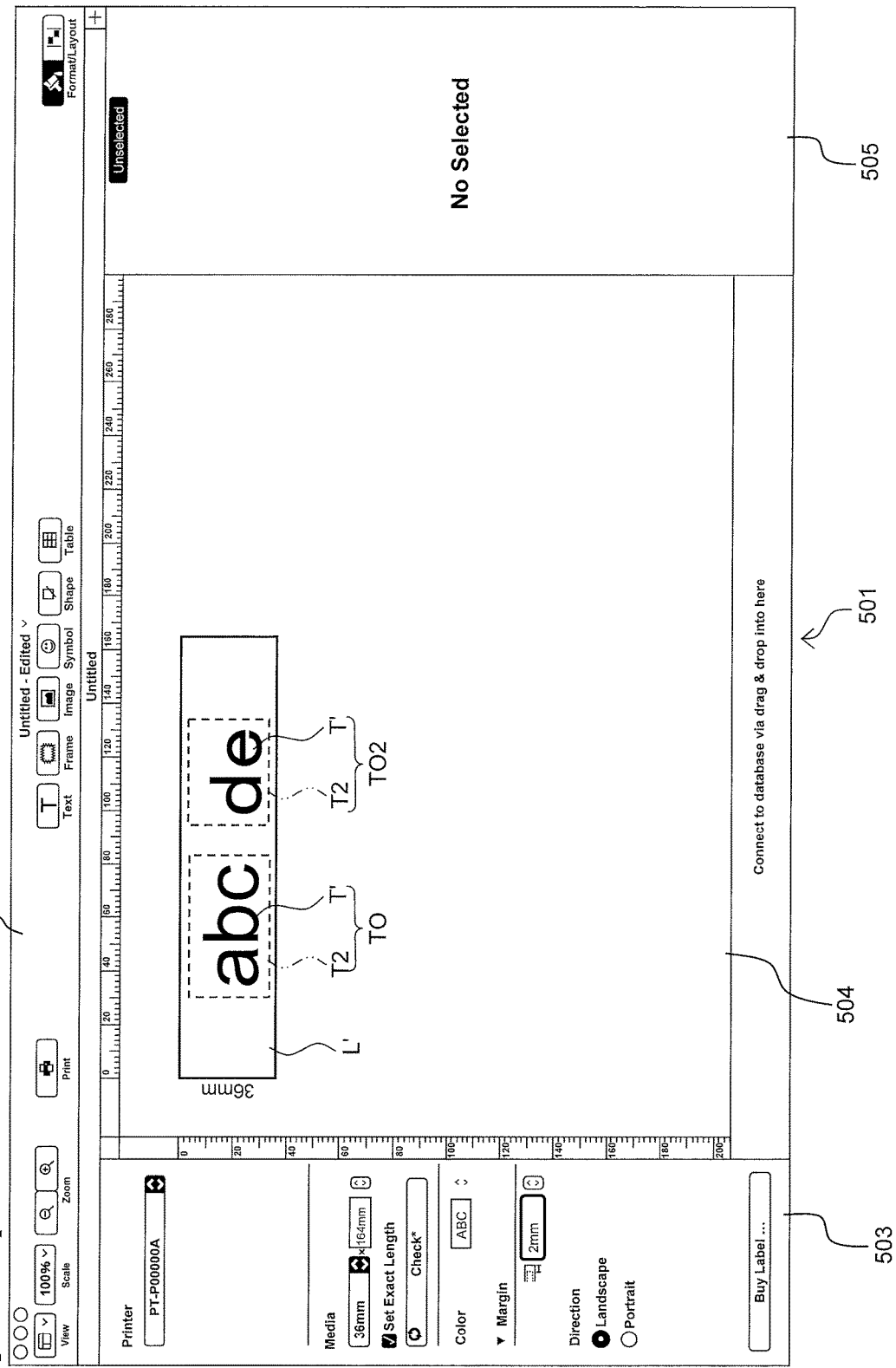
FIG. 18 is an explanatory view of a display example showing a state in which a text object is dropped to the appearance virtual image in the second embodiment.

On the other hand, when the drop operation is performed with the mouse in the state shown in FIG. 16, the text object TO2 can be pasted (combined on the screen) to the appearance virtual image L' as shown in FIG. 18. As a result, for example, among the label sizes corresponding to the appearance virtual image L' in the third state, the label dimension and the margin dimension in the tape length direction can automatically be changed to the label sizes corresponding to the appearance virtual image L' in the fourth state.

Figure 19:
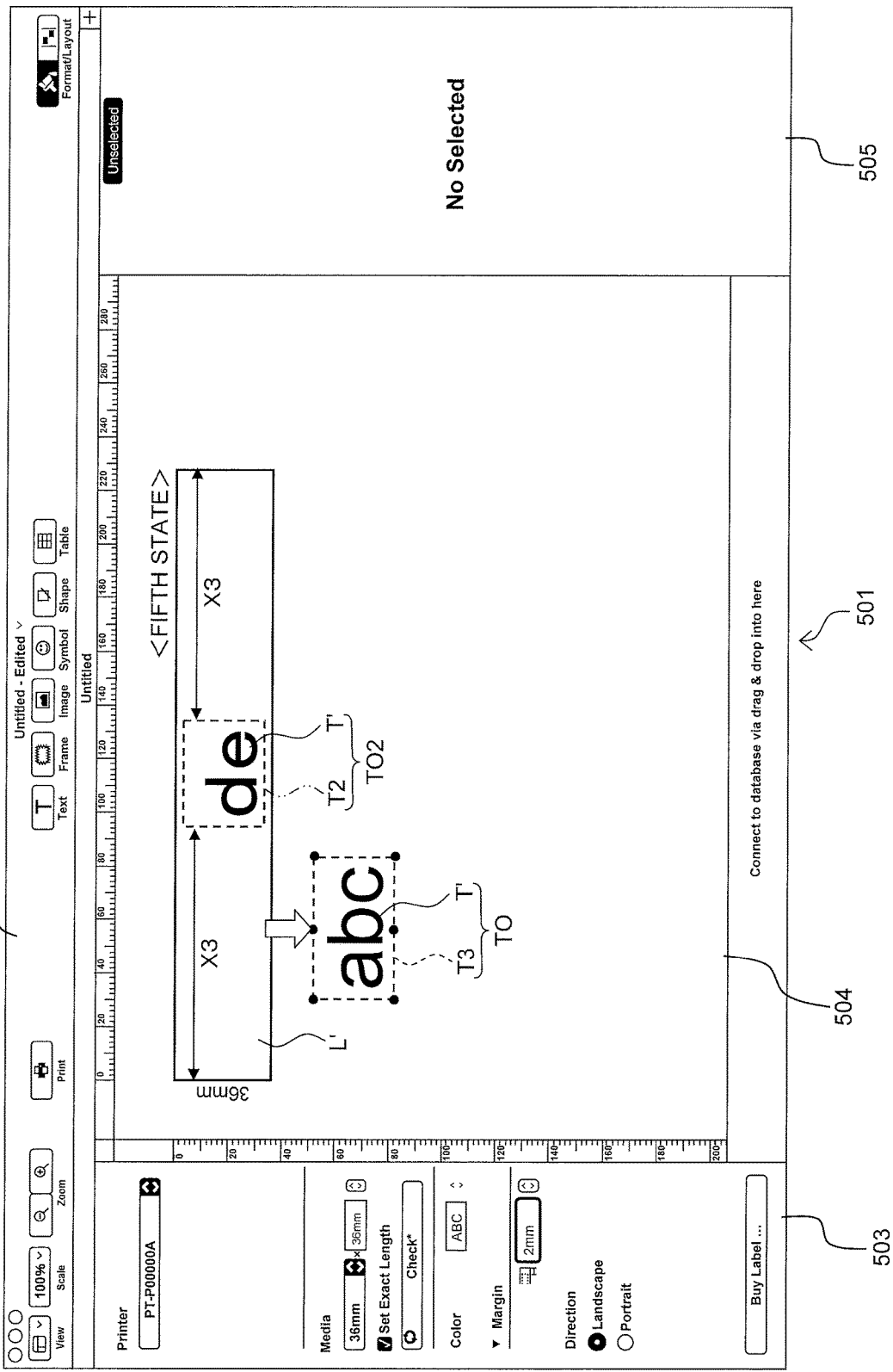
FIG. 19 is an explanatory view of a display example showing a state in which the preceding text object is detached from the appearance virtual image while leaving the other text object in the second example.

Alternatively, as shown in FIG. 19, after the drop operation of the other text object TO2, the preceding text object TO can be dragged and detached to the outside of the appearance virtual image L'. In this case, since the other text object TO2 remains in the appearance virtual image L', the left margin is set based on the other text object TO2 instead of the preceding text object TO, so that the right margin is changed to be the same as the left margin, and both margins are put into the state of X3 (fifth state). This control is performed at step S8 in the flow shown in FIG. 12 and corresponds to the second virtual image expansion procedure.

As described above, in the third state in which the appearance virtual image L' including one (preceding) text object TO is displayed on the editing screen 501 in the editing screen display procedure, and the appearance virtual image L' has substantially equal sizes of the one margin (X2) generated on one side in the first direction of the preceding text object TO and the other margin (X2) generated on the other side in the first direction of the text object TO or the text editing area frame T2, in the case that the (other) text object TO2 different from the preceding text object TO and located outside the appearance virtual image L' is determined as being moved and arranged onto the right extended line of the appearance virtual image L' in the drag operation determination procedure, the first virtual image expansion procedure can be performed to control the display part 17 to expand the appearance virtual image L' in the first direction to also include the other text object TO2 located on the right extended line and to achieve the fourth state in which the appearance virtual image L' expanded in the first direction has substantially equal sizes of the one margin (X2) generated on the one side in the first direction of the preceding text object TO and the other margin (X2) generated on the other side in the first direction of the other text object TO2.

Figure 12:
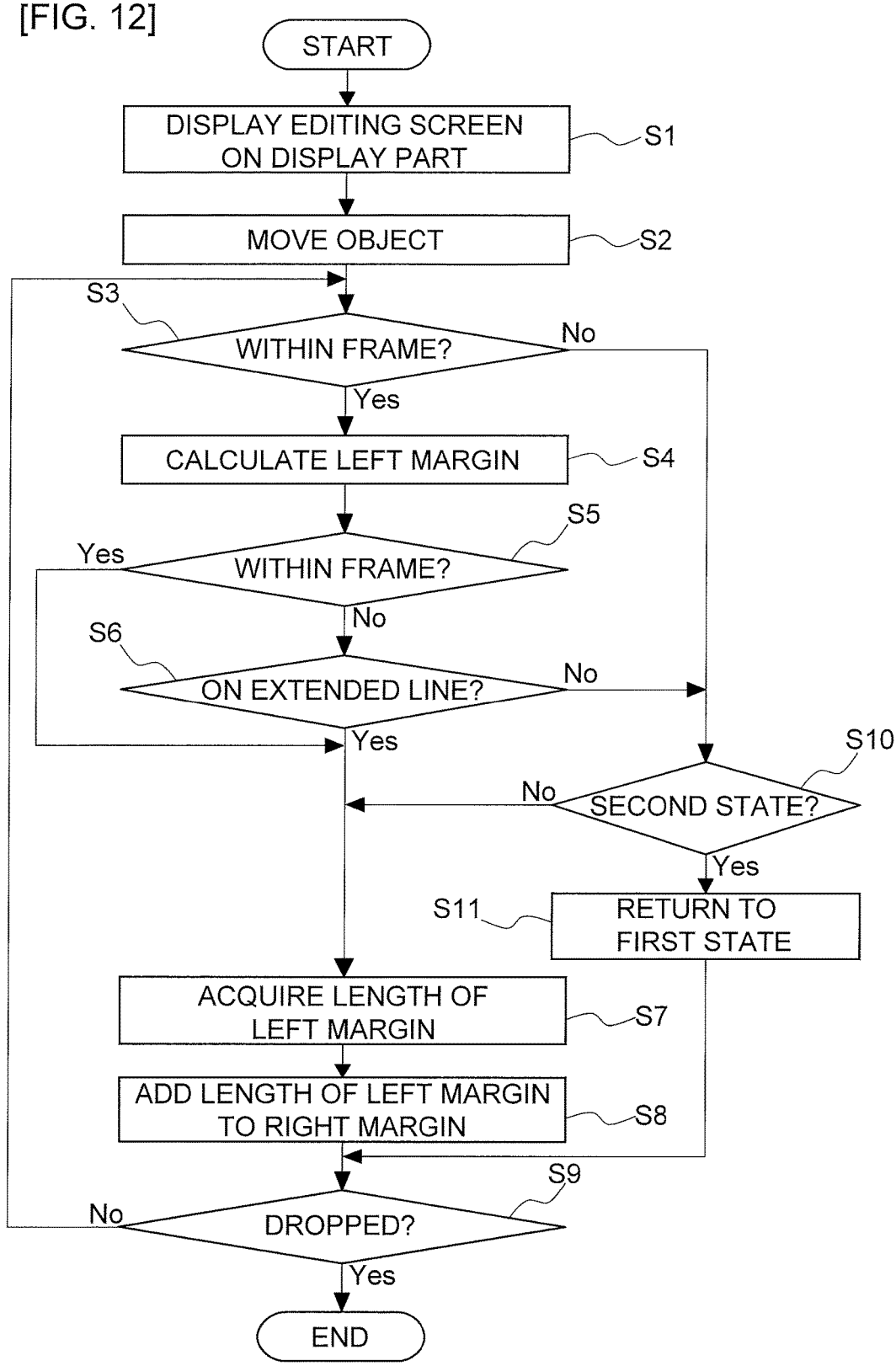
FIG. 12 is a flowchart showing an example of an image processing procedure for mode-specific setting performed by an arithmetic unit.

Specifically, in the case that the presence of the "preceding text object TO" is determined at step S3 of the flow shown in FIG. 12, the CPU 12 replaces the first state with the third state as described above, and in the case that the other text object TO 2 included in the appearance virtual image L' is dragged through the operation part 14 and detached to the outside of the appearance virtual image L' during the fourth state in which the appearance virtual image L' is expanded at step S8, the CPU 12 performs the second image contraction procedure for controlling the display part 17 to return from the fourth state to the third state.

Furthermore, in the case that the presence of the "preceding text object TO" is determined at step S3, when the appearance virtual image L' is in the fourth state in which the two text objects TO and TO2 are included in total at step S8, and the preceding text object TO is detached to the outside of the appearance virtual image L' through the drag operation via the operation part 14 (e.g., interrupt processing), leaving the other text object TO 2 included in the appearance virtual image L', the CPU 12 controls the display part 17 from the routine of the step S2 to perform at step S8 the second virtual image expansion procedure for shifting from the fourth state to the fifth state in which the appearance virtual image L' has substantially equal sizes of the one margin generated on the one side in the first direction of the other text object TO2 and the other margin generated on the other side in the first direction of the other text object TO2.

Example 3

Example 3 will be described with reference to FIGS. 20 to 25. In Example 3, the input information display area 504 of the editing screen 501 can be scrolled, or specifically, scroll display is enabled when the drag operation is performed to the outside of the screen along the first direction.

Figure 20:
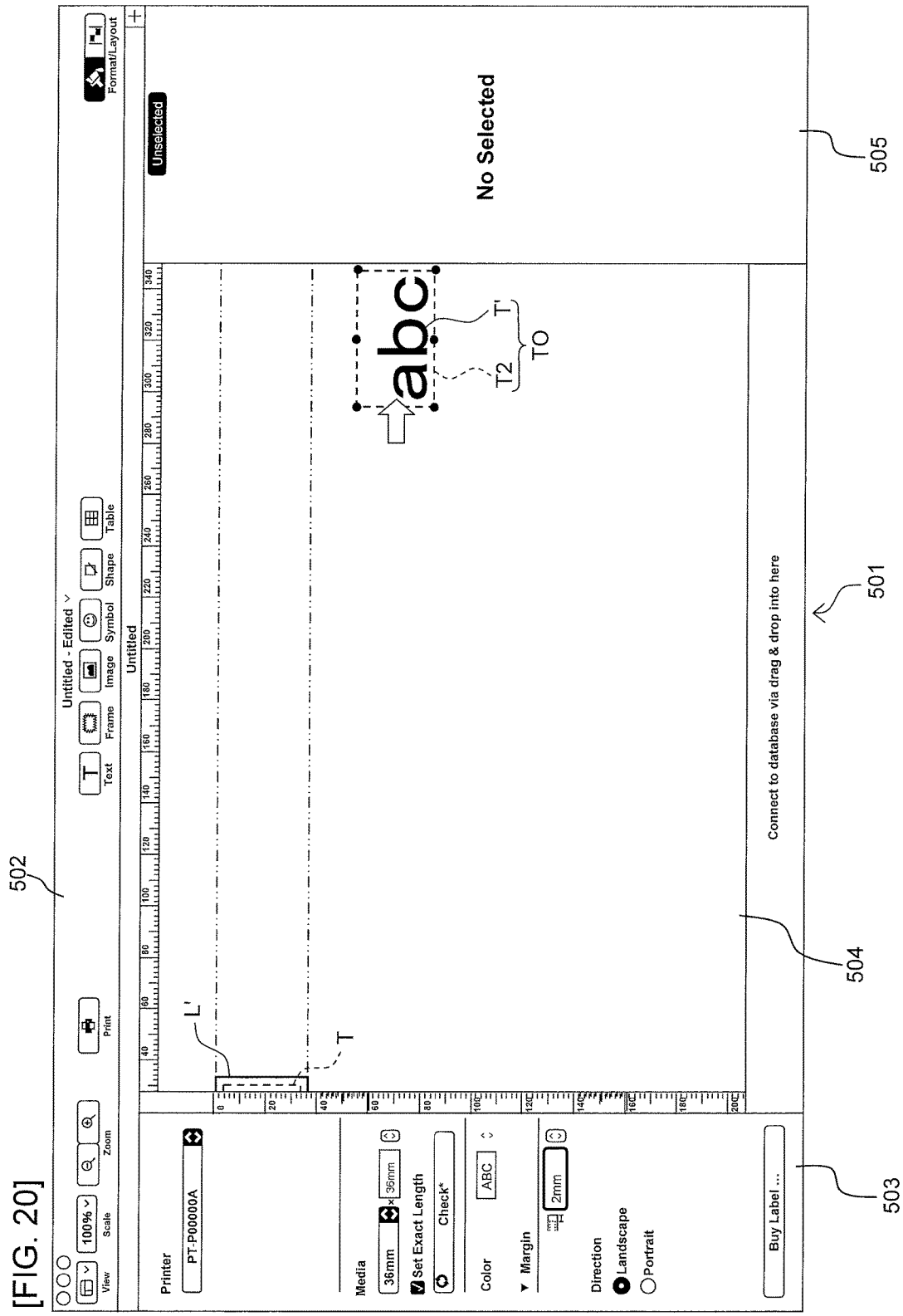
FIG. 20 is an explanatory view of a display example in a state of screen scrolling in the case of a large operation amount of the drag operation toward the right side of the screen in a third example.
Figure 21:
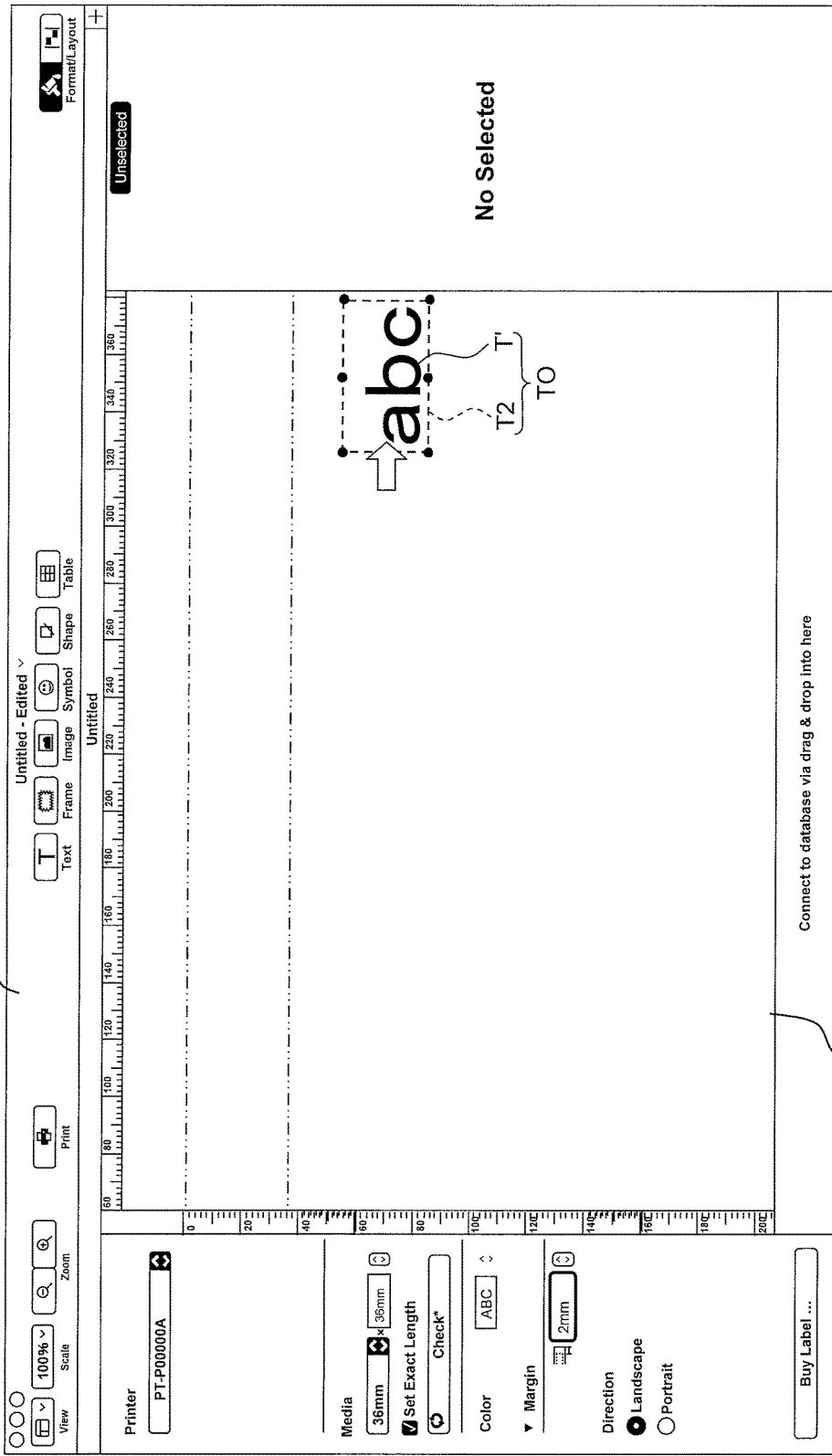
FIG. 21 is an explanatory view of a display example in a state in which the appearance virtual image is no longer visible on the screen due to the drug operation further performed toward the right side of the screen in the third example.

Therefore, as the text object TO is widely dragged to the right side relative to (the input information display area 504 of) the editing screen 501, as shown in FIG. 20, (the input information display area 504 of) the editing screen 501 is accordingly scrolled as a whole (along with the scale) to the right side, i.e., in the first direction, so that the appearance virtual image L' originally displayed in the input information display area 504 is moved to the left side of the screen. If the drag operation to the right side is continued in this way, the appearance virtual image L' finally goes out of the screen and disappears as shown in FIG. 21.

Figure 22:
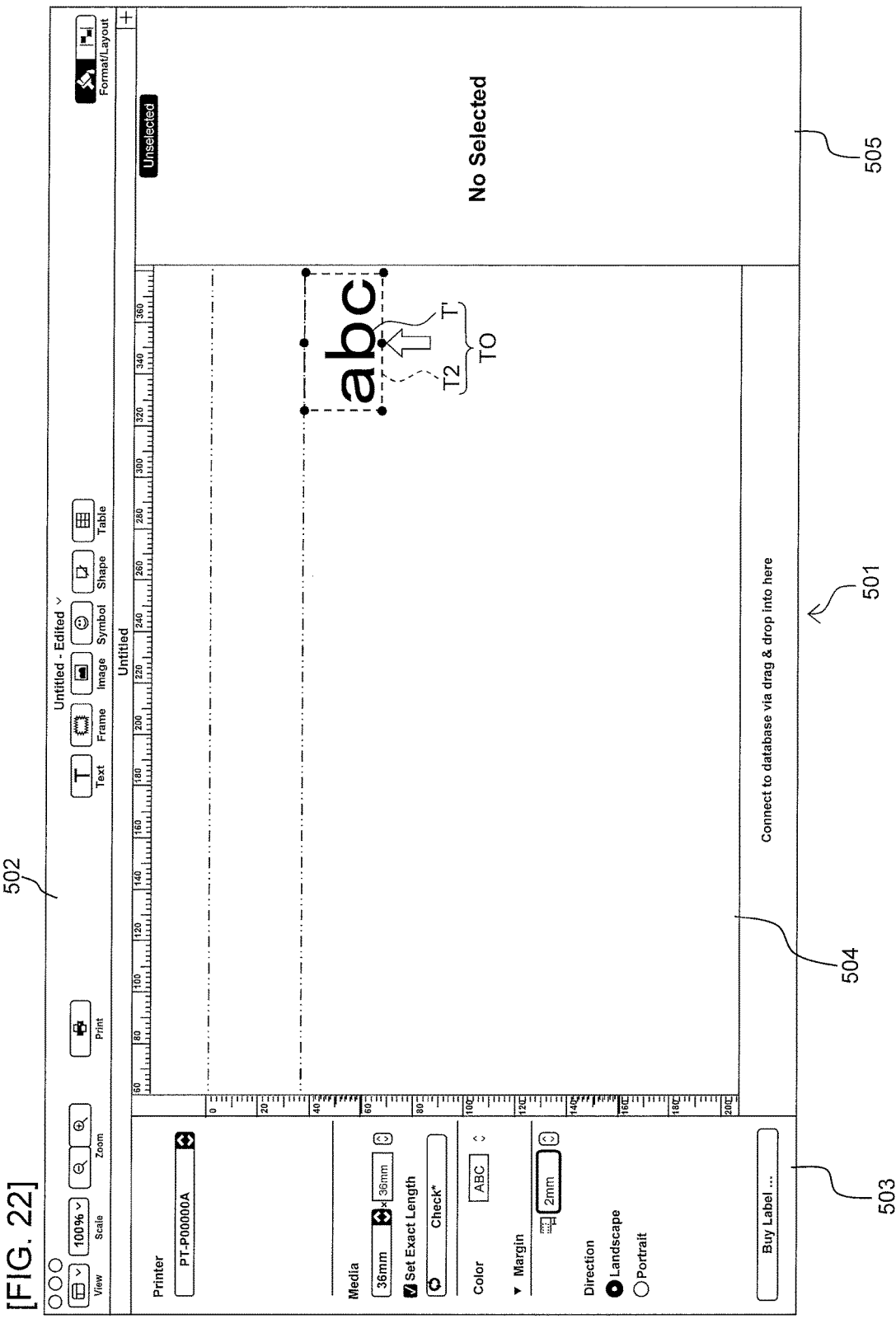
FIG. 22 is an explanatory view of a display example showing a state in which a portion of the text object dragged toward the appearance virtual image has reached the extended line of the appearance virtual image in the tape length direction in the third example.
Figure 23:
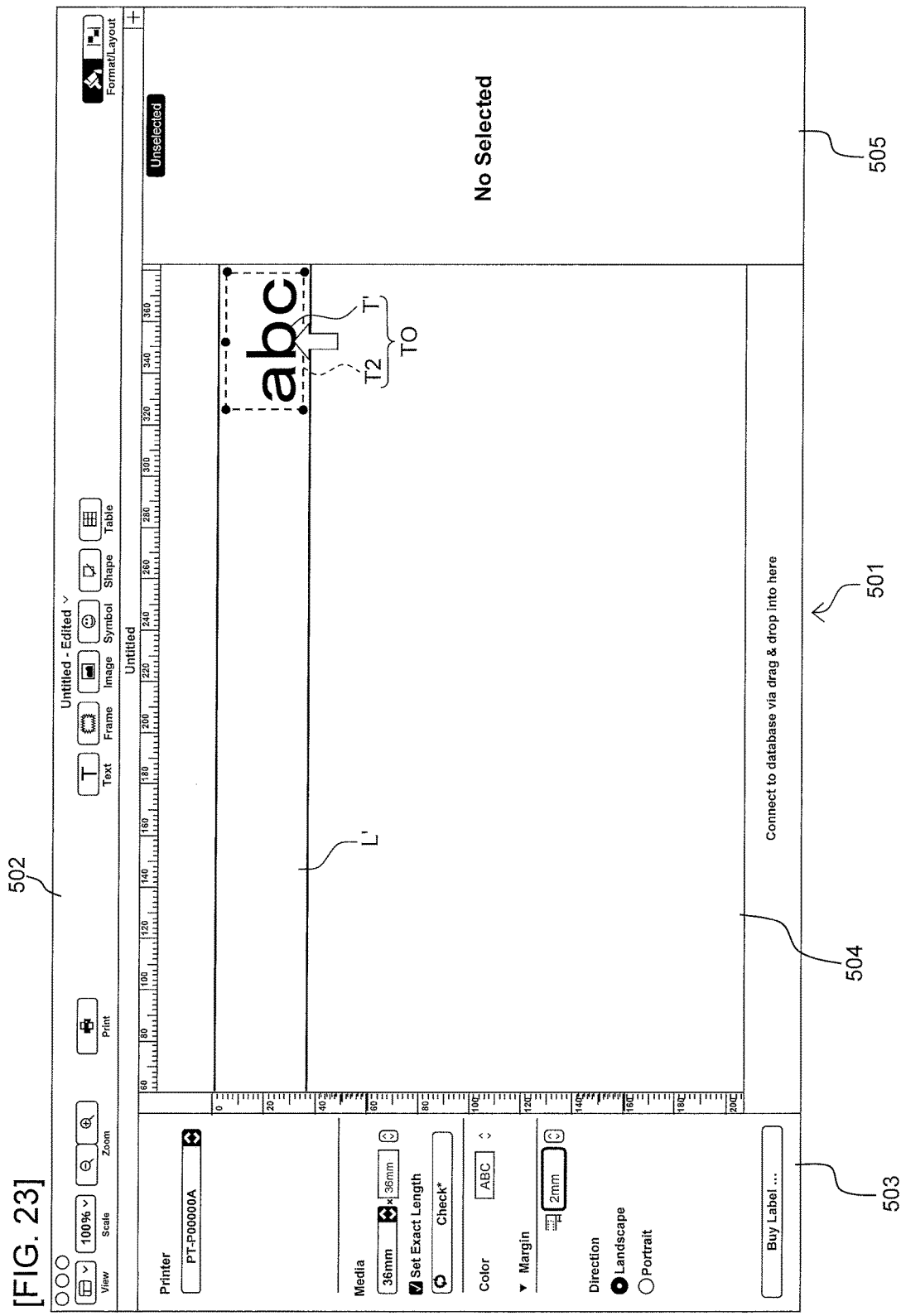
FIG. 23 is an explanatory view of a display example showing a state in which the appearance virtual image is expanded and contracted in conjunction with a drag operation along the tape length direction such that the text object is included in the appearance virtual image in the third embodiment.

From this state, when the text object TO is dragged upward and the text object TO reaches within the range on the right extended line of the appearance virtual image L' as shown in FIG. 22, the appearance virtual image L' immediately expands in the tape length direction to include the text object TO as shown in FIG. 23.

Figure 24:
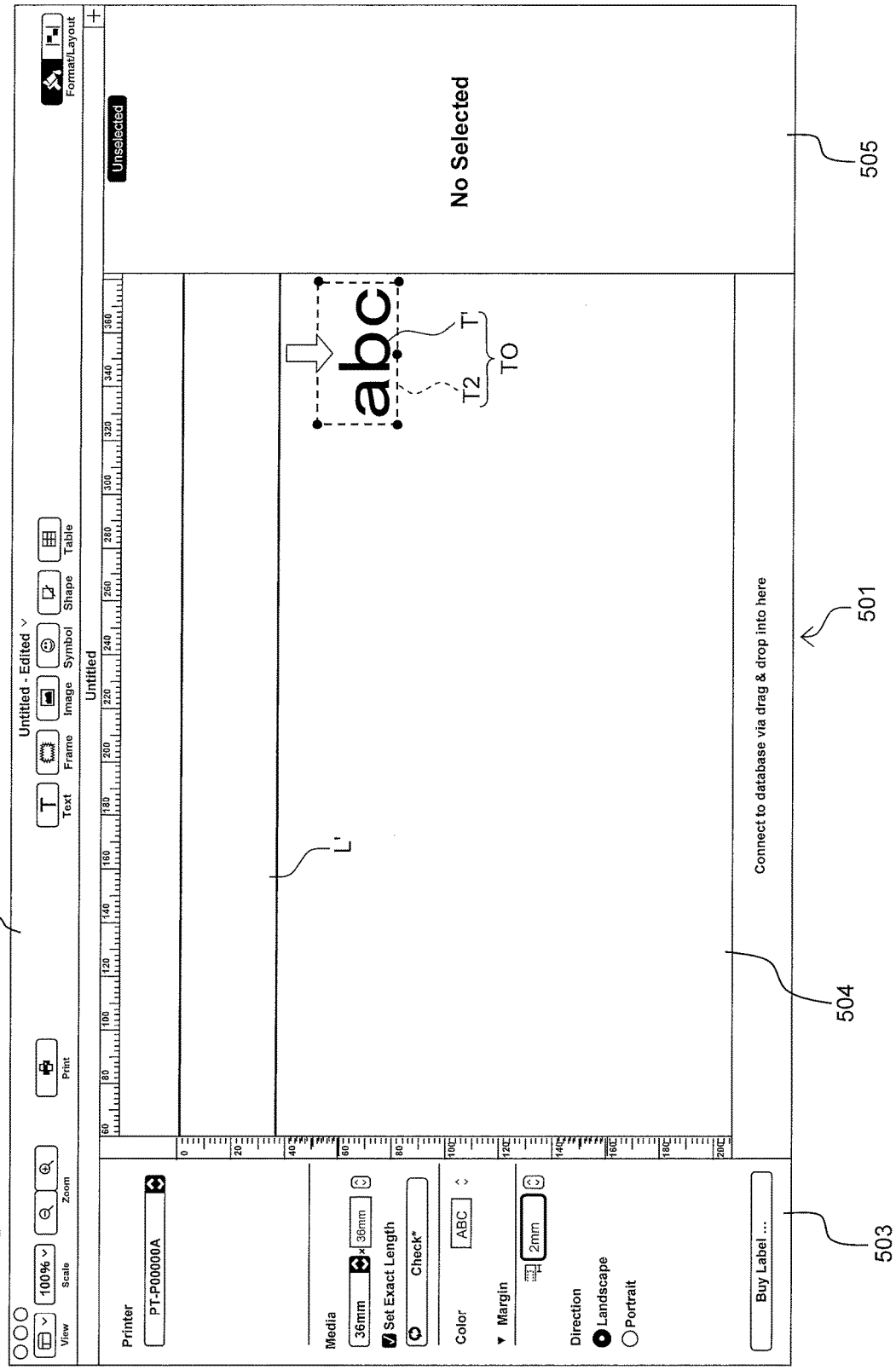
FIG. 24 is an explanatory view of a display example showing a state in which the text object is detached from the appearance virtual image in the third example.
Figure 25:
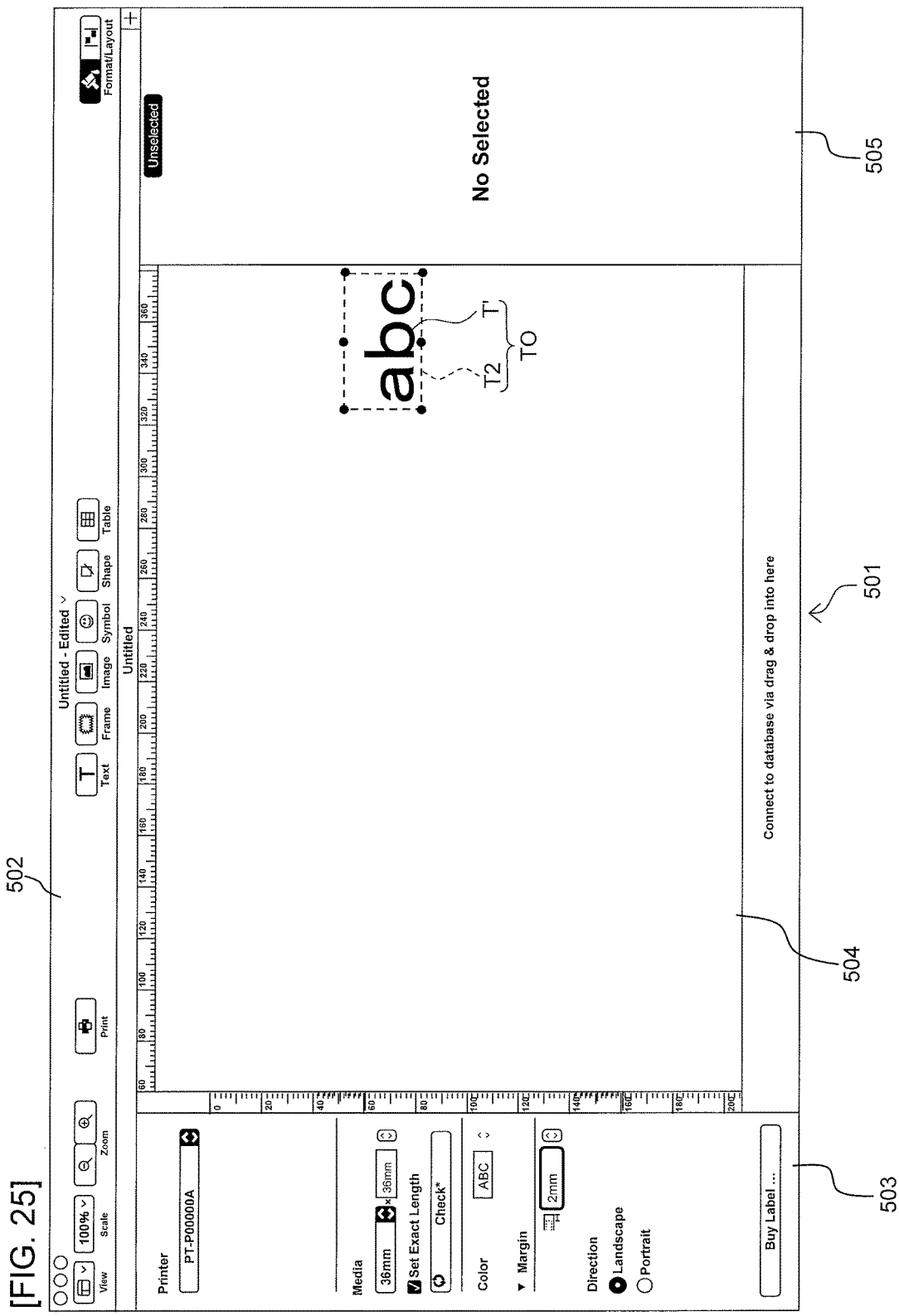
FIG. 25 is an explanatory view of a display example showing a state in which the text object is completely detached from the appearance virtual image in the third example.

On the other hand, when the text object TO is dragged downward from this state and detached to the outside of the appearance virtual image L' again as shown in FIG. 24, the expanded appearance virtual image L' is immediately contracted, returning to the original length. In this case, since the text object TO is dragged, the contracted appearance virtual image L' is not displayed as shown in FIG. 25, and the detached text object TO is preferentially displayed in the input information display area 504.

The process of the CPU 12 in Example 3 is substantially the same as Example 1 except the screen scrolling according to whether or not the length of the appearance virtual image L' is beyond (the input information display area 504 of) the editing screen 501. Therefore, in the flow shown in FIG. 12 performed by the CPU, while the appearance virtual image L' in the first state having a predetermined length is displayed on the editing screen 501, it is determined in the drag operation determination procedure performed at step S6 that the text object TO is arranged on the extended line and out of the display range of the editing screen 501, and the first virtual image expansion procedure is performed at step S8 for controlling the display part 17 to scroll the editing screen 501 to display the text object TO located on the extended line in the appearance virtual image L' in the second state (state after expansion) expanded in the first direction.

As a result, even in the case that the drag operation of the text object TO is performed to a position far away from the appearance virtual image L' before expansion, the expanded appearance virtual image L' can be displayed while scrolling the editing screen 501 to follow the drag operation.

In the case that the one text object TO included in the appearance virtual image L' is detached to the outside of the appearance virtual image L' when a portion including the one text object TO located on the extended line of the appearance virtual image L' in the second state is displayed in the first virtual image expansion procedure, the first virtual image contraction procedure is performed at step S11 to make a shift to a state in which the detached one text object TO is displayed in the editing screen 501 without displaying the appearance virtual image L' returned to the first state in the editing screen 501.

Example 4

Example 4 will be described with reference to FIGS. 26 to 28. Example 4 shows the case that, for example, the text object TO (or the text body T') dropped and already arranged in the appearance virtual image L' is directly dragged (along the first direction) to the right side of the appearance virtual image L'.

Figure 26:
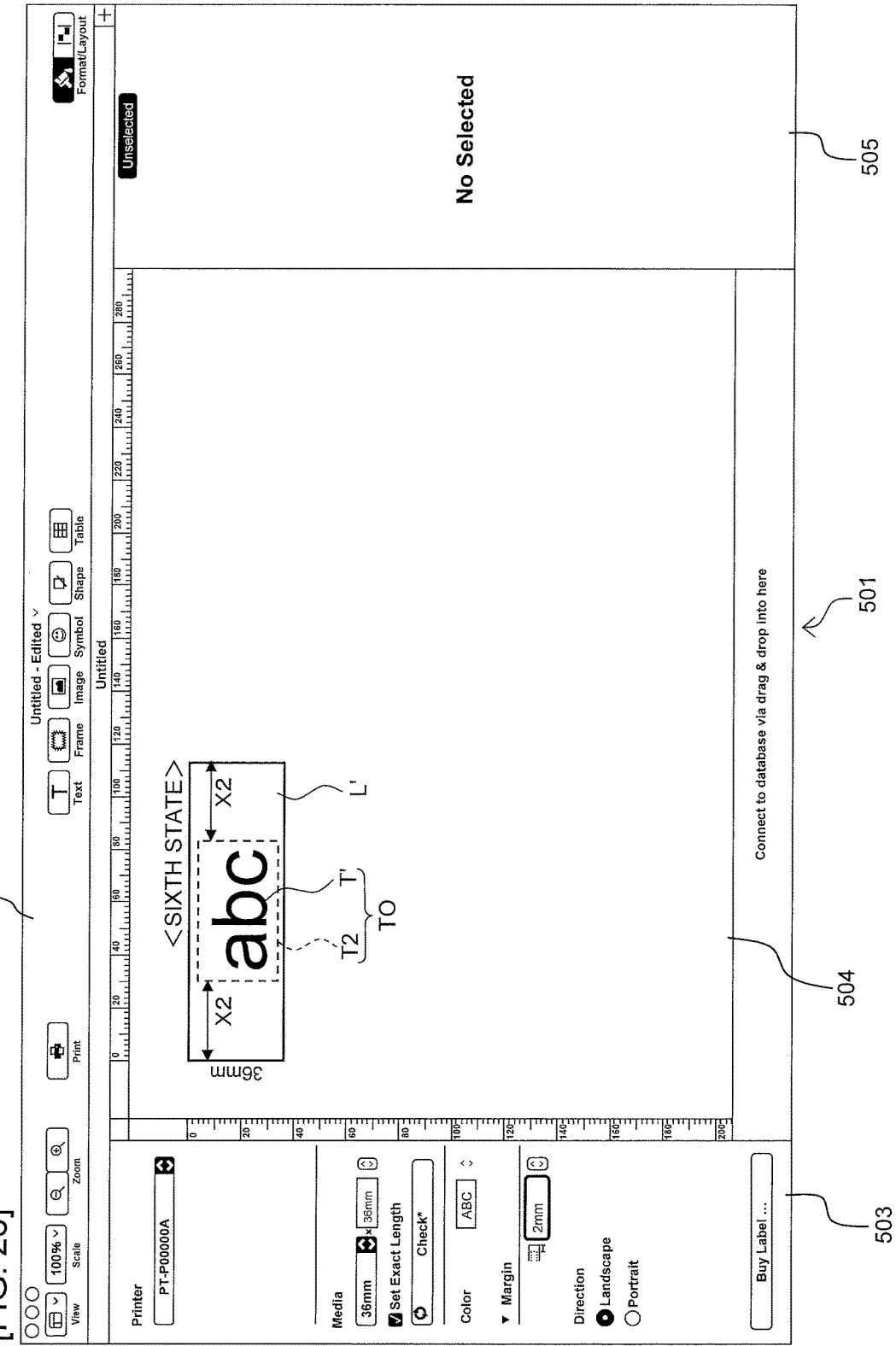
FIG. 26 is an explanatory view of a display example showing a relative positional relationship between a text object after a drop operation and an appearance virtual image in a fourth example.
Figure 27:
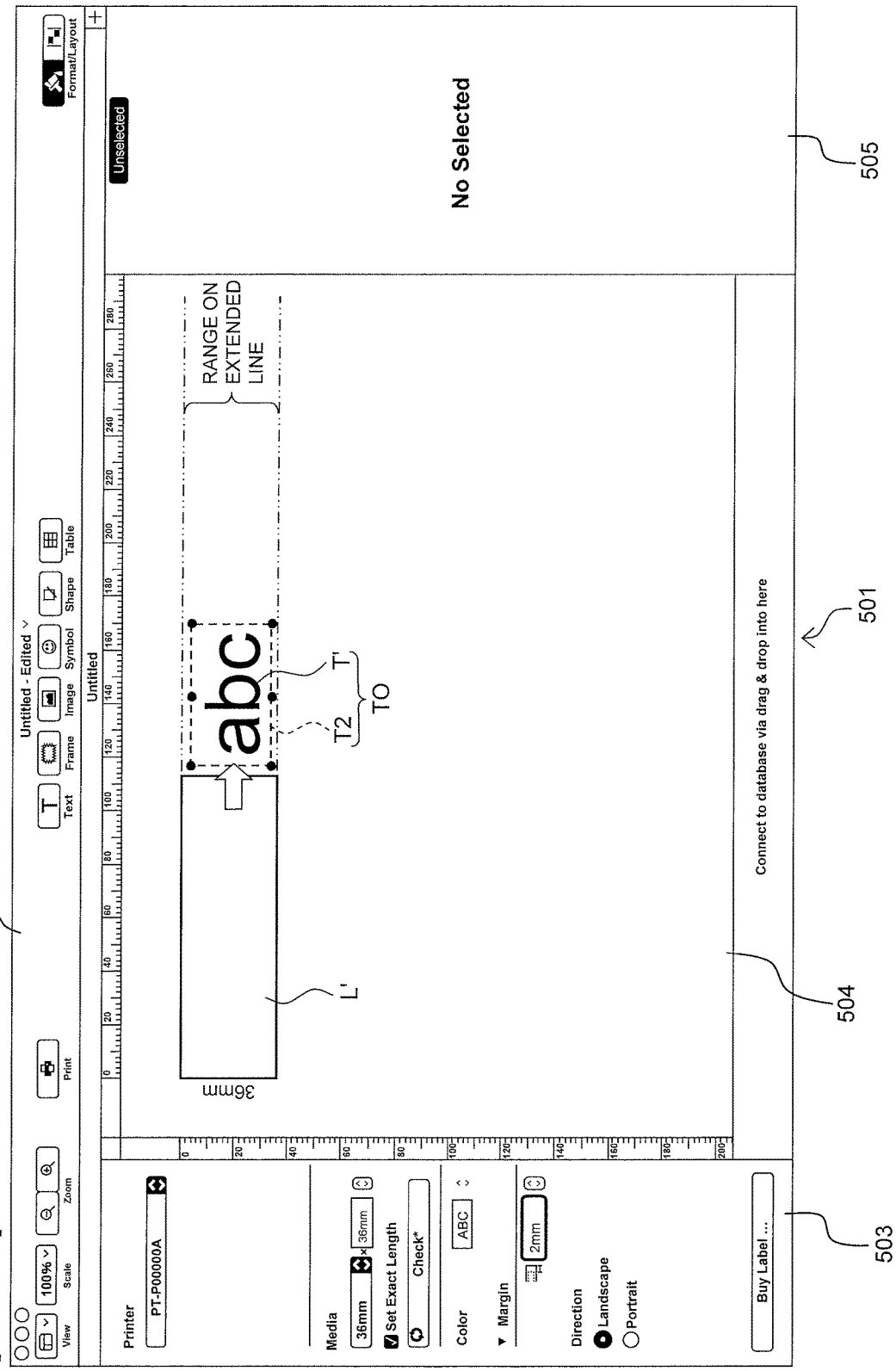
FIG. 27 is an explanatory view in the case that the text object after the drop operation is dragged again along a first direction of the appearance virtual image in the fourth example.
Figure 28:
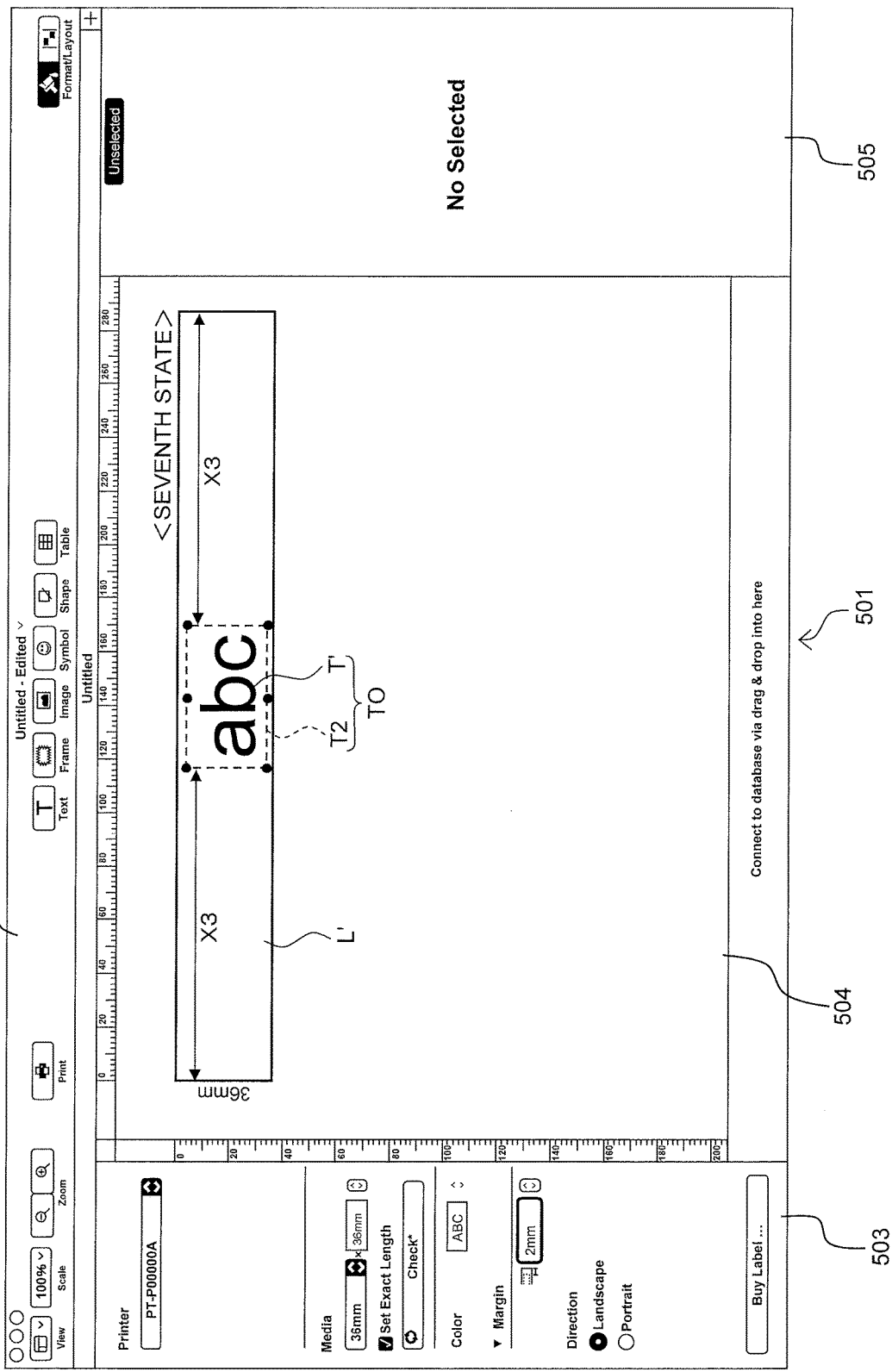
FIG. 28 is an explanatory view of a display example in the case that the text object after the drop operation is dragged again along the first direction of the appearance virtual image in the fourth example.

For example, in a state (sixth state) in which the text object TO is already arranged in the appearance virtual image L' with the left and right margins X2 as shown in FIG. 26, as the operator drags the text object TO (or the text body T') to the right as indicated by a white arrow of FIG. 27, the appearance virtual image L' is accordingly expanded in the tape length direction to include the moved text object TO as shown in FIG. 28 (seventh state) when the text object TO reaches within the range on the right extended line of the original appearance virtual image L' in the sixth state. In this case, in the flow shown in FIG. 12 performed by the CPU, the length of the left margin and the length of the right margin of the text object TO are both (always) made equal to X3 since the CPU 12 continuously processes steps S4 to S8.

Therefore, as shown in FIG. 26, from the moment when the operator starts dragging the text object TO to the right side of the appearance virtual image L', the CPU 12 continuously processes steps S4 to S8, and therefore, the appearance virtual image L' is expanded while making the length of the left margin and the length of the right margin of the text object TO always equal to each other. Therefore, the state shown in FIG. 27 is for the purpose of describing the situation, and actually, the text object TO is not detached to the outside of the appearance virtual image L' unless the text object TO is even momentarily deviated and detached in the second direction.

Therefore, in the case that the one text object TO included in the appearance virtual image L' is determined as being moved and arranged on the extended line of the appearance virtual image L' in the drag operation determination procedure performed at step S6 while the appearance virtual image L' of the sixth state including the one text object TO is displayed on the editing screen 501, the first virtual image expansion procedure can be performed at step S8 for controlling the display part 17 to expand the appearance virtual image L' in the first direction to include the text object TO located on the extended line and thereby achieve the seventh state in which the appearance virtual image L' expanded in the first direction has substantially equal sizes of the one margin generated on the one side in the first direction of the text object TO and the other margin generated on the other side in the first direction of the text object TO.

The present disclosure is not limited to the embodiment and can variously be modified without departing from the spirit and the technical ideas thereof. Such modification examples will hereinafter be described in order.

(1) In Examples, the text object TO including the text editing area frame T2 and the text body T' is moved together, however, for example, as shown in FIGS. 29 to 32, only the text editing area frame T2 (or only the text main body T') of the text object TO can be moved.

Figure 29:
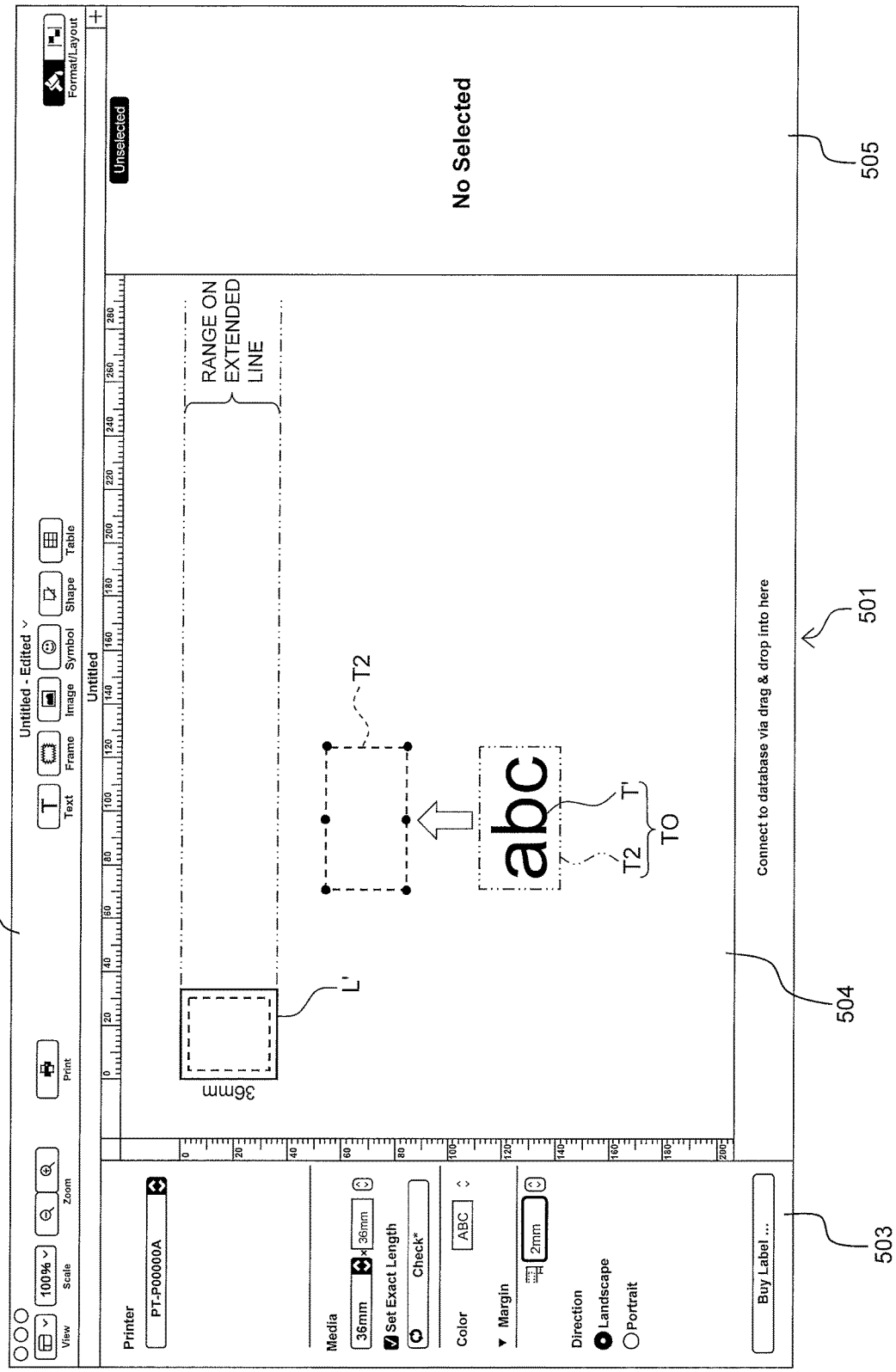
FIG. 29 is an explanatory view of a display example while only a text editing area frame of the text object is dragged toward the appearance virtual image in Modification Example 1.
Figure 30:
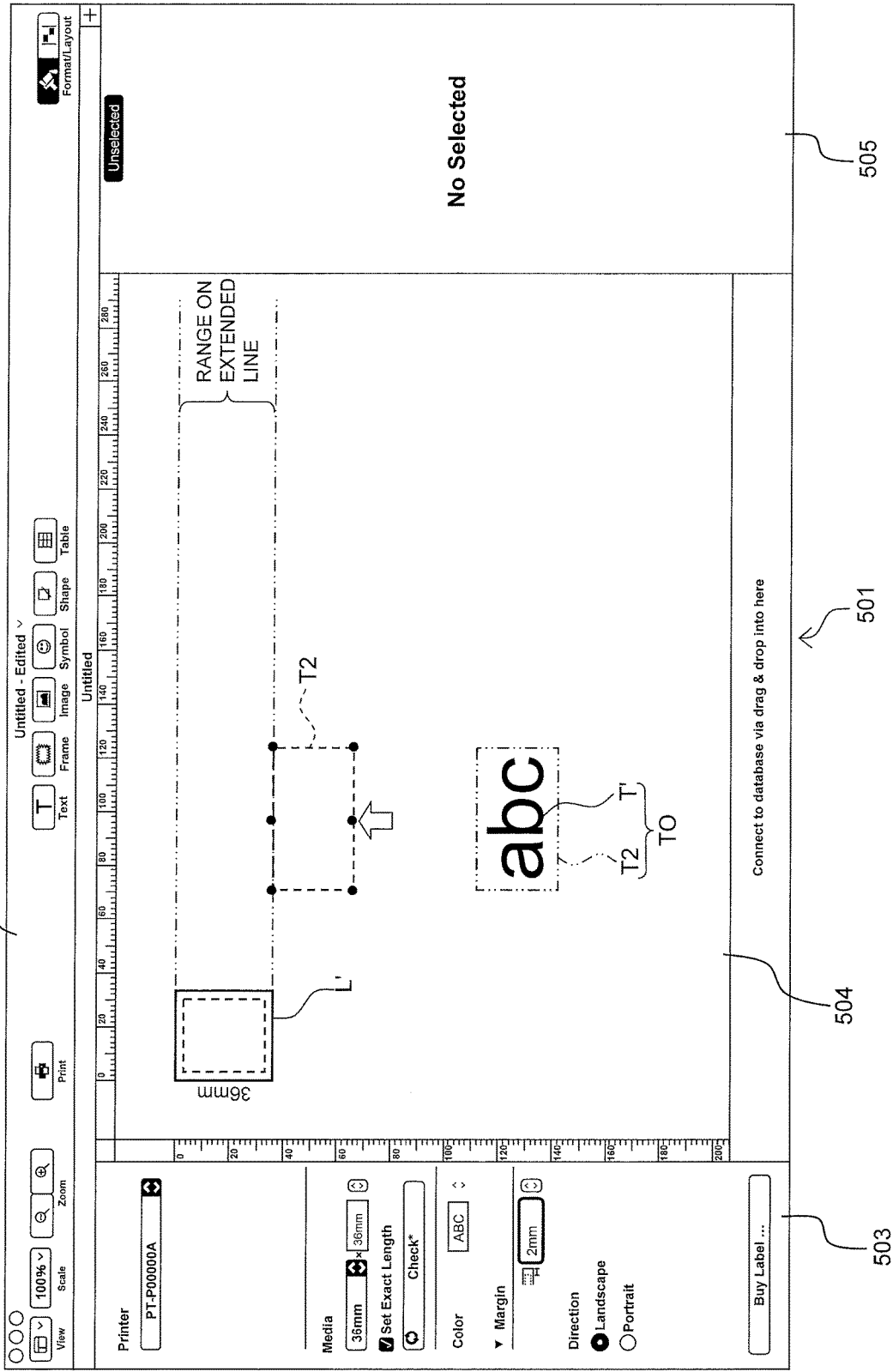
FIG. 30 is an explanatory view of a display example showing a state in which a portion of the text editing area frame dragged toward the appearance virtual image has reached an extended line of the appearance virtual image in the tape length direction in Modification Example 1.
Figure 31:
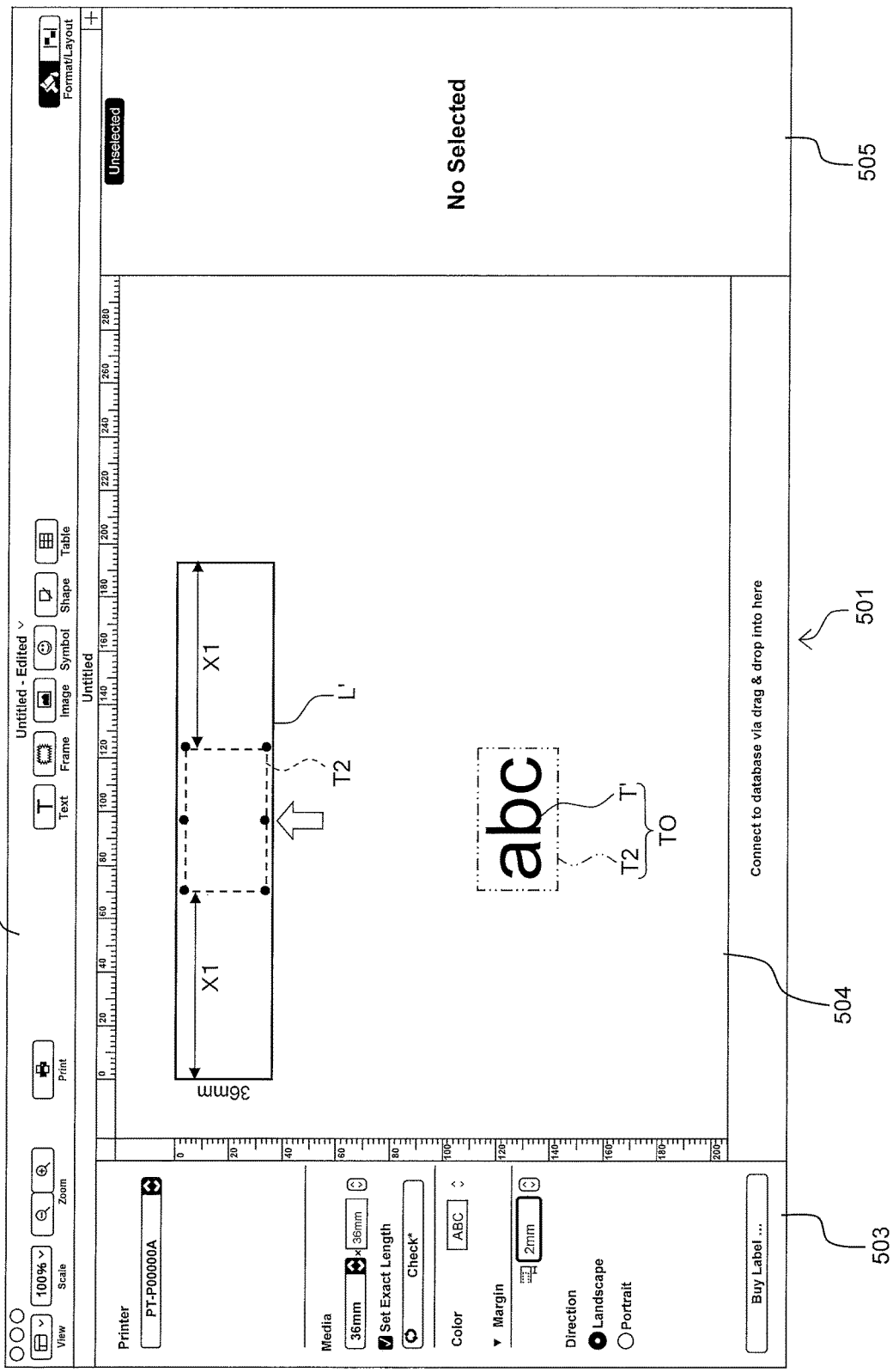
FIG. 31 is an explanatory view of a display example showing a state of the appearance virtual image expanded in the tape length direction to include the text editing area frame in Modification Example 1.

Specifically, as shown in FIG. 29, only the text editing area frame T2 of the text object TO is dragged toward the appearance virtual image L' (in this case, the text body T' does not move and remains in the original input position), when the upper edge of the text editing area frame T2 reaches within the range (or reaches the lower edge) on the right extended line of the appearance virtual image L' as shown in FIG. 30, the appearance virtual image L' expands in the tape length direction to include the text editing area frame T2 as shown in FIG. 31 and enters the second state In this case, as described above, the appearance virtual image L' can be expanded (in appearance) such that the length of the left margin of the text editing area frame T2 and the length of the right margin are both made equal to X1, or in other words, such that the text editing area frame T2 is centered with respect to the appearance virtual image L'.

Subsequently, for example, by releasing the mouse to perform the drop operation, the text editing area frame T2 is pasted to the appearance virtual image L' as shown in FIG. 32. The text body T' remaining in the original place then also moves to the moved text editing area frame T2, so that the text object TO can be arranged in the appearance virtual image L'.

In this case, in the flow shown in FIG. 12 performed by the CPU, in the case that the appearance virtual image L' in the first state is displayed on the editing screen 501 and that the one text editing area frame T2 located outside the appearance virtual image L' is determined as being moved and arranged onto the right extended line of the appearance virtual image L' in the drag operation determination procedure performed at step S6, the first virtual image expansion procedure can be performed at step S8 to control the display part 17 to expand the appearance virtual image L' in the first direction to include the one text editing area frame T2 located on the right extended line and to achieve the second state in which the appearance virtual image L' expanded in the first direction has substantially equal lengths of the one margin generated on the one side in the first direction of the one text editing area frame T2 and the other margin generated on the other side in the first direction of the one text editing area frame T2.

(2) Similarly, the case of dragging only the text editing area frame T2 is also applicable to the case of scrolling the (input information display area 504 of) the editing screen 501.

Therefore, as the text editing area frame T2 is widely dragged to the right side, (the input information display area 504 of) the editing screen 501 is scrolled as a whole to the right side, so that the displayed appearance virtual image L' is moved to the left side of the screen and finally disappears as shown in FIG. 34. In this scrolling state, the text main body T' not shown is also moved while appearing and disappearing depending on the position thereof.

From this state, when the text editing area frame T2 is dragged upward and the text editing area frame T2 reaches within the range on the right extended line of the appearance virtual image L' as shown in FIG. 35, the appearance virtual image L' immediately expands in the tape length direction to include the text editing area frame T2 as shown in FIG. 36.

Subsequently, when the text editing area frame T2 is dragged downward from this state and detached to the outside of the appearance virtual image L' again as shown in FIG. 37, the expanded appearance virtual image L' is immediately contracted, returning to the original length. In this case, since only the text editing area frame T2 not including the text body T' is dragged, the contracted appearance virtual image L' is preferentially displayed as shown in FIG. 38, and the detached text editing area frame T2 is not displayed.

In this case, in the flow shown in FIG. 12 performed by the CPU, in the case that the one text editing area frame T2 included in the appearance virtual image L' is detached to the outside of the appearance virtual image L' when a portion including the one text editing area frame T2 located on the extended line of the appearance virtual image L' in the second state is displayed, the first virtual image contraction procedure is performed at step S11 to make a shift to a state in which the appearance virtual image L' returned to the first state not including the text editing area frame T2 is displayed in the editing screen 501 without displaying the detached one text editing area frame T2 in the editing screen 501.

(3) Instead of preferentially displaying either the contracted appearance virtual image L' or the text object TO (or only the text editing area frame T2) as described above, reduced display may be performed by adjusting the scale of the whole of (the input information display area 504 of) the editing screen 501 as shown in FIG. 39, for example. FIG. 39 shows the case that both the contracted appearance virtual image L' and the text editing area frame T2 are displayed.

In this case, in the flow shown in FIG. 12 performed by the CPU, in the case that the text object TO (or the text editing area frame T2) included in the appearance virtual image L' is detached to the outside of the appearance virtual image L' when the text object TO (or a portion including the text editing area frame T2) located on the extended line of the appearance virtual image L' in the second state is displayed, the first virtual image contraction procedure is performed at step S11 to make a shift to a state of displaying both the appearance virtual image L' returned to the first state not including the text object TO (or the text editing area frame T2) and the detached text object TO (or text editing area frame T2) in the reduced (input information display area 504 of) editing screen 501.

(4) In Examples described above, the case of the thermal type label printer 3 has been described as an example; however, the present disclosure is also applicable, for example, to the case that a printer of an ink-jet type etc. is operated by an operation terminal.

In this case, for example, in an A4 printer etc., pages of A4 paper with an up-down direction defined as the longitudinal direction continue in many cases, and therefore, the "first direction" described as the direction along the tape length direction is the up-down direction that is the longitudinal direction of the A4 paper, and the "second direction" is the left-right direction orthogonal to the first direction.

What is claimed is:

1. A non-transitory computer-readable recording medium storing a printing processing program for executing steps on a CPU of an editing apparatus that is connected to a printer configured to produce a printed matter by forming a print on a print-receiving paper having a first direction and a second direction orthogonal to each other and that has a display device, an operation device, and said CPU,
said steps comprising:
an editing screen display step for controlling said display device to display an editing screen that includes an appearance virtual image of said printed matter and is for editing at least a print object;
a drag operation determination step for determining whether or not, among said print object displayed in said editing screen, a text object composed of a text editing area frame and a text arranged inside said text editing area frame, or said text editing area frame, is moved by a drag operation via said operation device and arranged on an extended line of said appearance virtual image in said first direction; and
a first virtual image expansion step for controlling said display device to expand said appearance virtual image displayed on said editing screen along said first direction to include at least a portion of said text object or said text editing area frame arranged on said extended line, in the case that it is determined in said drag operation determination step that said text object or said text editing area frame is arranged on said extended line of said appearance virtual image.

2. The recording medium according to claim 1, wherein in the case that said appearance virtual image in a first state not including said text object or said text editing area frame is displayed on said editing screen in said editing screen display step and that it is determined in said drag operation determination step that one said text object or one said text editing area frame located outside said appearance virtual image is moved and arranged onto said extended line of said appearance virtual image,
in said first virtual image expansion step, said display device is controlled to expand said appearance virtual image along said first direction to include said one text object or said one text editing area frame located on said extended line and to achieve a second state in which a size of one margin generated on one side in said first direction of said one text object or said one text editing area frame is substantially equal to a size of the other margin generated on the other side in said first direction of said one text object or said one text editing area frame in said appearance virtual image expanded along said first direction.

3. The recording medium according to claim 2, wherein said steps further comprises
a first virtual image contraction step for controlling said display device to return from said second state to said first state in the case that said one text object or said one text editing area frame included in said appearance virtual image is detached to the outside of said appearance virtual image by the drag operation via said operation device when said display device is at said second state in said first virtual image expansion step.

4. The recording medium according to claim 3, wherein in the case that it is determined in said drag operation determination step that said one text object or said one text editing area frame is arranged on said extended line and out of a display range of said editing screen while said appearance virtual image having a predetermined length in said first state is displayed on said editing screen,
in said first virtual image expansion step, said display device is controlled to scroll said editing screen to display a portion that belongs to said appearance virtual image in said second state expanded along said first direction and includes said one text object or said one text editing area frame located on said extended line.

5. The recording medium according to claim 4, wherein in the case that said one text editing area frame included in said appearance virtual image is detached to the outside of the appearance virtual image when the portion that belongs to said appearance virtual image in said second state and includes said one text editing area frame located on said extended line is displayed in said first virtual image expansion step,
in said first virtual image contraction step, a shift is made to a state in which said appearance virtual image returned to said first state not including said text editing area frame is displayed in said editing screen without displaying the detached one text editing area frame in said editing screen.

6. The recording medium according to claim 4, wherein in the case that said one text object included in said appearance virtual image is detached to the outside of the appearance virtual image when the portion that belongs to said appearance virtual image in said second state and includes said one text object located on said extended line is displayed in said first virtual image expansion step, in said first virtual image contraction step, a shift is made to a state in which the detached one text object is displayed in said editing screen without displaying said appearance virtual image returned to said first state in said editing screen.

7. The recording medium according to claim 4, wherein in the case that said one text object or said one text editing area frame included in said appearance virtual image is detached to the outside of the appearance virtual image when the portion that belongs to said appearance virtual image in said second state and includes said one text object or said one text editing area frame located on said extended line is displayed in said first virtual image expansion step, in said first virtual image contraction step, a shift is made to a state in which both said appearance virtual image returned to said first state not including said one text object or said one text editing area frame and the detached one text object or the detached one text editing area frame are displayed in said editing screen that is reduced.

8. The recording medium according to claim 1, wherein, in a third state in which said appearance virtual image including said one text object or said one text editing area frame is displayed on said editing screen in said editing screen display step, and a size of one margin generated on one side in said first direction of said one text object or said one text editing area frame is substantially equal to a size of the other margin generated on the other side in said first direction of said one text object or said one text editing area frame in said appearance virtual image, in the case that it is determined that said text object or said text editing area frame different from said one text object or said one text editing area frame that is located outside said appearance virtual image is moved and arranged onto said extended line of said appearance virtual image in said drag operation determination step, in said first virtual image expansion step, said display device is controlled to expand said appearance virtual image along said first direction to include the different text object or text editing area frame located on said extended line and to achieve a fourth state in which a size of said one margin generated on one side in said first direction of said one text object or said one text editing area frame is substantially equal to a size of the other margin generated on the other side in said first direction of the different text object or text editing area frame in said appearance virtual image expanded along said first direction.

9. The recording medium according to claim 8, wherein said steps further comprises a second virtual image contraction step for controlling said display device to return from said fourth state to said third state in the case that the different text object or the different text editing area frame included in said appearance virtual image is detached to the outside of said appearance virtual image by the drag operation via said operation device when said display device is at said fourth state in said first virtual image expansion step.

10. The recording medium according to claim 8, wherein said steps further comprises a second virtual image expansion step for controlling said display device to make a shift from said fourth state to a fifth state in which a size of one margin generated on one side in said first direction of the different text object or the different text editing area frame is substantially equal to a size of the other margin generated on the other side in said first direction of the different text object or the different text editing area frame in said appearance virtual image, in the case that said one text object or said one text editing area frame included in said appearance virtual image is detached to the outside of the appearance virtual image by the drag operation via said operation device when said display device is at said fourth state in said first virtual image expansion step.

11. The recording medium according to claim 1, wherein in the case that said appearance virtual image in a sixth state including one said text object or one said text editing area frame is displayed on said editing screen in said editing screen display step and that it is determined in said drag operation determination step that said one text object or said one text editing area frame included in said appearance virtual image is moved and arranged onto said extended line of said appearance virtual image, in said first virtual image expansion procedure, said display device is controlled to expand said appearance virtual image along said first direction to include said one text object or said one text editing area frame located on said extended line and to achieve a seventh state in which a size of one margin generated on one side in said first direction of said one text object or said one text editing area frame is substantially equal to a size of the other margin generated on the other side in said first direction of said one text object or said one text editing area frame in said appearance virtual image expanded along said first direction.

12. The recording medium according to claim 1, wherein said printer is a label producing apparatus configured to produce a print label as said printed matter by forming a print on a print-receiving tape as said print-receiving paper, wherein said first direction is a tape length direction of said print-receiving tape, and wherein said second direction is a tape width direction of said print-receiving tape.

\* \* \* \* \*